(12) United States Patent
Kim et al.

(10) Patent No.: US 7,171,212 B2
(45) Date of Patent: Jan. 30, 2007

(54) METHOD FOR SETTING UP SIGNALING CONNECTION IN A MOBILE COMMUNICATION SYSTEM

(75) Inventors: Soeng-Hun Kim, Suwon-shi (KR); Joon-Goo Park, Seoul (KR); Sung-Ho Choi, Songnam-shi (KR); Kook-Heui Lee, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 351 days.

(21) Appl. No.: 10/438,419

(22) Filed: May 15, 2003

(65) Prior Publication Data
US 2003/0224794 A1 Dec. 4, 2003

(30) Foreign Application Priority Data
May 17, 2002 (KR) .................. 10-2002-0027514

(51) Int. Cl.
*H04Q 7/20* (2006.01)
*H04Q 7/00* (2006.01)

(52) U.S. Cl. .................. 455/450; 455/509; 455/517; 455/3.01; 455/3.02; 455/3.03; 370/328; 370/338; 370/390; 370/522

(58) Field of Classification Search ............... 455/450, 455/517, 3.02, 3.01, 3.03, 509; 370/230, 370/352, 328, 338, 390, 522
See application file for complete search history.

(56) References Cited

U.S. PATENT DOCUMENTS

| | | | | |
|---|---|---|---|---|
| 6,813,638 | B1 * | 11/2004 | Sevanto et al. | 709/227 |
| 6,928,268 | B1 * | 8/2005 | Kroner | 455/69 |
| 2003/0018773 | A1 * | 1/2003 | Beckmann et al. | 709/223 |
| 2003/0043786 | A1 * | 3/2003 | Kall et al. | 370/352 |
| 2003/0099196 | A1 * | 5/2003 | Sebire | 370/230 |
| 2003/0105825 | A1 * | 6/2003 | Kring et al. | 709/206 |
| 2003/0134653 | A1 * | 7/2003 | Sarkkinen et al. | 455/517 |

FOREIGN PATENT DOCUMENTS

| | | |
|---|---|---|
| JP | 2001-505021 | 4/2001 |
| JP | 2002094562 A * | 3/2002 |
| WO | WO 98/25422 | 6/1998 |

* cited by examiner

*Primary Examiner*—George Eng
*Assistant Examiner*—Hu Phan
(74) *Attorney, Agent, or Firm*—The Farrell Law Firm

(57) ABSTRACT

A method for setting up signaling connection between an RNC and an SGSN in a mobile communication system is provided. Upon receiving a service request for a particular MBMS service from a particular UE, an RNC determines whether it is necessary to set up new signaling connection for the particular MBMS service, and sets up signaling connection with an SGSN according to the determination result. The SGSN, if it desires to stop the particular MBMS service, sends a service stop request to the RNC over the signaling connection set for the particular MBMS service. The RNC then instructs at least one UE providing the particular MBMS service to stop the particular MBMS service in response to the service stop request.

20 Claims, 9 Drawing Sheets

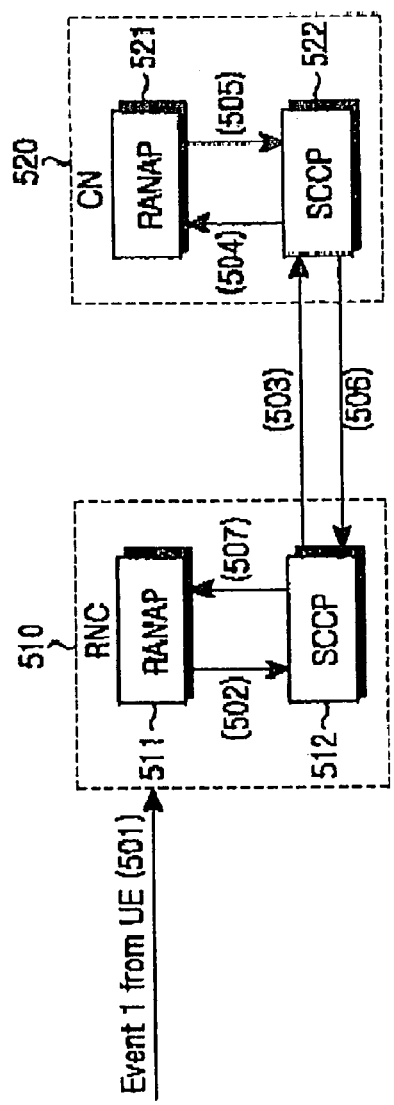

FIG.5
(PRIOR ART)

501 : EVENT 1 MEANS THAT THE MESSAGE OF UE TO BE TRANSMITTED TO CN IS ARRIVED UNDER THE CONDITION THAT SIGNALING CONNECTION BETWEEN UE AND CN IS NOT ESTABLISHED.
502 : initial UE message = [Iu signaling connection id, NAS message etc]
503 : CR = [LR_RNC, initial UE message]
504 : initial UE message = [Iu signaling connection id, NAS message etc]
505 : RANAP message (if any)
506 : CC = [LR_CN, LR_RNC, RANAP message (if any)]
507 : RANAP message (if any)
RNC sends UE related RANAP message with LR_RNC. RNC stores LR_RNC and Iu signaling connection id.
CN sends UE related RANAP message with LR_RNC. CN stores LR_CN and Iu signaling connection id.

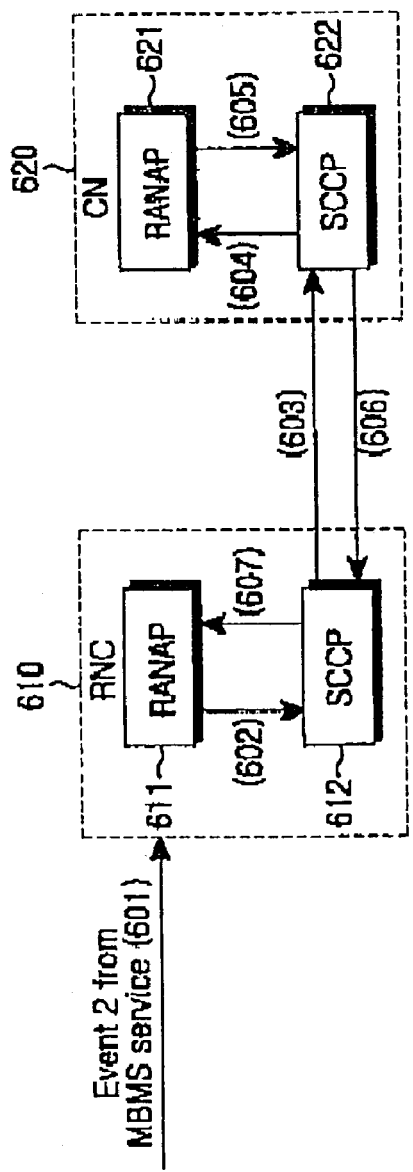

601 : EVENT 2 MEANS THAT MESSAGES RELATIVE TO SERVICE IS ARRIVED UNDER THE CONDITION THAT SIGNALING CONNECTION BETWEEN RNC AND CN IS NOT ESTABLISHED.
602 : initial SEVICE message = [Iu signaling connection id, NAS message etc]
603 : CR = [LR_RNC, initial SEVICE message]
604 : initial SEVICE message = [Iu signaling connection id, NAS message etc]
605 : RANAP message (if any)
606 : CC = [LR_CN, LR_RNC, RANAP message (if any)]
607 : RANAP message (if any)
RNC sends service related RANAP message with LR_CN.
RNC stores [MBMS service identifier, LR_RNC, LR_CN, Iu signaling connection id]
CN sends UE related RANAP message with LR_RNC.
CN stores [LR_RNC, LR_CN, Iu signaling connection id]

FIG.6

METHOD FOR SETTING UP SIGNALING CONNECTION IN A MOBILE COMMUNICATION SYSTEM

PRIORITY

This application claims priority under 35 U.S.C. § 119 to an application entitled "Method for Setting Up Signaling Connection in a Mobile Communication System" filed in the Korean Intellectual Property Office on May 17, 2002 and assigned Ser. No. 2002-27514, the contents of which are incorporated herein by reference.

BACKGROUND OF THE INVENTION

1. Field of the Invention

The present invention relates generally to a method for setting up signaling connection in a mobile communication system, and in particular, to a method for setting up signaling connection between an RNC (Radio Network Controller) and an SGSN (Serving GPRS (General Packet Radio Service) Supporting Node).

2. Description of the Related Art

Recently, because of the development of the communication industry, a service provided by a code division multiple access (hereinafter referred to as "CDMA") mobile communication system is being developed to include multicasting multimedia communication for transmitting voice service data and high-capacity data, such as packet data and circuit data. In order to support the multicasting multimedia communication, a broadcast/multicast service is required in which one data source provides a service to a plurality of user equipments (hereinafter referred to as "UEs"). The broadcast/multicast service can be divided into a cell broadcast service (hereinafter referred to as "CBS"), which is a message-based service, and a multimedia broadcast/multicast service (hereinafter referred to as "MBMS") supporting multimedia data, such as real-time image and voice, still image, and text.

The MBMS refers to a service for transmitting the same multimedia data to a plurality of UEs over a radio network. The UEs share one radio channel to save radio resources. The CBS refers to a service for broadcasting a plurality of messages to all UEs located in a particular service area. The particular service area where the CBS is provided can become the entire area where the CBS is provided in one cell. The MBMS, supporting both voice data and image data, requires a great number of transmission resources. Therefore, the MBMS is serviced over a broadcasting channel, because of the possibility that a plurality of services will be simultaneously provided in one cell.

As described above, in a mobile communication system, signaling procedures between respective elements for providing the MBMS service must be proposed. Therefore, in order to provide the MBMS service, the mobile communication system should define messages for the signaling procedures between the elements and types of information included in the messages. In addition, the mobile communication system must propose a procedure for updating service contexts needed to provide the MBMS service, using the information, and a procedure for setting up signaling connection by the service contexts.

A signaling procedure proposed in the conventional mobile communication system will now be described herein below.

Conventionally, Iu signaling connection is formed for an individual UE by setting up an RRC (Radio Resource Control) connection by the UE. If the RRC connection is released, the Iu signaling connection is also released: A process of setting up the Iu signaling connection will be described below with reference to FIG. 5.

Referring to FIG. 5, if an event #1 originates from a UE in step 501, an RNC 510 prepares to set up an Iu signaling connection. Event #1 is an event in which a message to be transmitted to a core network (hereinafter referred to as "CN") 520 has arrived from a particular UE before signaling connection is set up between the UE and the CN 520. Typically, the event #1 represents an event where a particular UE sets up RRC connection with an RNC 510, and then transmits an RRC message of an Up link Direct Transfer message to the RNC 510 through the RRC connection. If the Iu signaling connection to the UE is not set up, the RNC 510 sets up the Iu signaling connection, converts the Uplink Direct Transfer message into an RANAP (Radio Access Network Application Part) message of an Initial UE Message, and transmits the RANAP message to the CN 520. The message transmitted to the CN 520 by the RNC 510 is comprised of control information of only one UE.

More specifically, if the event #1 occurs in step 501, the RNC 510 forms an Initial UE Message based on a message that caused the event #1. At this point, an RANAP 511 determines a signaling connection id (identifier) corresponding to the UE and delivers the information to an SCCP (Signaling Connection Control Part) layer 512 along with the Initial UE Message (Step 502). The SCCP layer 512 forms an SCCP message called CR (Connection Request) in accordance with Equation 1, and transmits the SCCP message to an SCCP layer 522 of a CN 520 (Step 503).

$$CR=[LR_{RNC}, \text{Initial UE Message}] \quad (1)$$

The CR is a message transmitted to initially set up an SCCP connection by the SCCP layer 512 of the RNC 510, and an LR_RNC (Local Reference RNC) constituting the CR message is a temporary identifier assigned to the SCCP connection by the SCCP layer 512. After the SCCP connection is set up, the SCCP layer 522 of the CN 520 identifies the SCCP connection, using the LR_RNC constituting the SCCP message. Upon receiving the CR message, the SCCP layer 522 of the CN 520 assigns an LR_CN (Local Reference CN) by delivering an Initial UE Message included in a payload part of the CR message to the RANAP 521 (Step 504). The LR_CN is a temporary identifier for SCCP connection to be set up through the CR message.

After the SCCP connection is setup, the RNC 510 identifies the SCCP connection using the LR_CN when transmitting an SCCP message. The RANAP 521 of the CN 520 stores an Iu signaling connection id included in the received Initial UE Message, and delivers an RANAP message, if any, to the SCCP layer 522 (Step 505). However, if there is no RANAP message to send, step 505 can be omitted. The SCCP layer 522 forms an SCCP message called CC (Connection Confirm), using the LR_CN, and transmits the SCCP message to the RNC 510 (Step 506).

$$CC=[LR\_CN, LR\_RNC, \text{RANAP Message}] \text{ (existing} \\ \text{only when step 505 is performed)} \quad (2)$$

The CC is a response message transmitted from the SCCP layer 522 that received the CR to the SCCP layer 512 that transmitted the CR, while a particular SCCP connection is set up.

The SCCP layers 512 and 522, which newly set up the SCCP connection, exchange the CR and the CC, thereby recognizing the temporary identifiers LR_RNC and LR_CN assigned to SCCP connection by the other party. In addition, the SCCP layers 512 and 522 include the temporary identifiers in the SCCP message when exchanging the SCCP message using the SSCP connection.

The SCCP layer 512 stores LR_CN upon receiving the CC. If a RANAP message is included in the CC, the SCCP layer 512 delivers the message to the RANAP 511 (Step 507).

A state where the RNC 510 and the UE share [LR_RNC, LR_CN, Iu signaling connection id] for particular SCCP connection through the above process is a state where Iu signaling connection is set up. Thereafter, when desiring to transmit a RANAP message through the SCCP connection or when desiring to transmit a SCCP connection-related message from a UE to the CN 520, the RNC 510 forms an SCCP message including LR_RNC and LR_CN stored together with the In signaling connection id, and delivers the SCCP message to the CN 520. The CN 520 receives an RANAP message included in the SCCP message for a UE indicated by an In signaling connection id corresponding to the LR_CN and the LR_RNC included in the received SCCP message.

FIG. 7 illustrates a process of exchanging MBMS-related RANAP messages in a conventional method. If N UEs of UE #1 to UE #N exist in a particular RNC area, each of the UEs desires to request reception of a particular MBMS service. If each UE transmits a first MBMS Service Request message to an RNC, the RNC performs an RNC Service Context initialization process and an RNC Service Context UE list update process. In succession, the RNC transmits a second MBMS Service Request message and a plurality of MBMS Service Update messages to an SGSN (or CN), using Iu signaling connections of the UE #1 to the UE #N. However, if there is no Iu signaling connection, the RNC sets up new Iu signaling connection for the corresponding UE, and then transmits the MBMS-related RANAP messages to the SGSN.

Referring to FIG. 7, if an RNC receives a first MBMS Service Request message from a UE #1 in step 701-1, it performs a necessary operation such as RNC Service Context initialization to determine whether an event #1 situation has occurred. That is, the RNC determines whether In signaling connection has already been set up for the UE #1. If the Iu signaling connection has already been set up, the RNC transmits a second MBMS Service Request message to an SGSN, using the set Iu signaling connection in step 702-1.

If the RNC receives a first MBMS Service Request message from the UE #N in step 701-N, it performs a necessary operation such RNC Service Context UE list updating to determine whether an event #1 situation has happened. That is, the RNC determines whether Iu signaling connection has already been set up for the UE #N. If the Iu signaling connection has already been set up, the RNC transmits an MBMS Service Update message to the SGSN, using the set In signaling connection, in step 702-N. However, if the Iu signaling connection is not set up, the RNC sets up Iu signaling connection for the UE #N, and then transmits the MBMS Service Update message to the SGSN. Setting up of the Iu signaling connection for the UE #N is performed by the process presented in FIG. 5.

It will be assumed that a particular MBMS service is being provided to corresponding UEs. The SGSN must notify the RNC, if the MBMS service is ended at a certain time when the MBMS service is provided. For that purpose, the SGSN delivers an RANAP message of an MBMS Service Stop message to all UEs.

MBMS Service Stop=[TYPE, MBMS Identifier]         (3)

The MBMS Service Stop messages are individually transmitted to the RNC through Iu signaling connections formed for the UEs receiving the MBMS service in steps 703-1 to 703-N. In steps 704-1 to 704-N, the RNC converts the MBMS Service Stop message into an appropriate RRC message (e.g., Stop Indication message), and transmits the RRC message to the UEs.

Stop Indication=[TYPE, MBMS Identifier]         (4)

As illustrated in FIG. 7, because signaling connections of related UEs are used to transmit MBMS-related RANAP messages, the same contents message such as the MBMS Service Stop message must be transmitted to all UEs undesirably.

SUMMARY OF THE INVENTION

It is, therefore, an object of the present invention to provide a method for setting up a signaling connection between an RNC and an SGSN in a mobile communication system.

It is another object of the present invention to propose types of information included in messages used for an MBMS service in a mobile communication system.

It is further another object of the present invention to provide a method for generating service contexts based on information included in messages used for an MBMS service in a mobile communication system.

It is yet another object of the present invention to provide a method for updating service contexts for an MBMS service in a mobile communication system.

It is still another object of the present invention to provide a method for setting up a signaling connection for an MBMS service according to service types in a mobile communication system.

It is still another object of the present invention to provide a method for reducing signaling connections for an MBMS service in a mobile communication system.

According to a first aspect of the present invention, there is provided a method for providing a predetermined MBMS (Multimedia Broadcast/Multicast Service) service to at least two cells among a plurality of cells desiring to receive a predetermined MBMS service among a plurality of MBMS services from an MB-SC (MBMS Source Center) in a system including a radio network controller (RNC) connected to a plurality of the cells, an SGSN (Serving GPRS (General Packet Radio Service) Supporting Node) connected to the RNC, and the MB-SC connected to the SGSN. The method comprises the steps of transmitting an MBMS service message with service identification information indicating the predetermined MBMS service from the SGSN to the RNC; and delivering the predetermined MBMS service message to a plurality of the cells acquired from cell information corresponding to MBMS service identification information received from the SGSN in an RNC service context stored in the RNC, the RNC service context including the MBMS service identification information indicating the MBMS services and the cell information indicating a cell list where the cells desiring to receive each of the MBMS services are registered.

According to a second aspect of the present invention, there is provided a method for providing a predetermined MBMS (Multimedia Broadcast/Multicast Service) service to at least two cells among a plurality of cells desiring to receive the predetermined MBMS service among a plurality of MBMS services from an MB-SC (MBMS Source Center)

in a radio network controller (RNC) connected to a plurality of the cells, an SGSN (Serving GPRS (General Packet Radio Service) Supporting Node) connected to the RNC, and the MB-SC connected to the SGSN. The method comprises the steps of transmitting an MBMS service message with service identification information indicating the predetermined MBMS service from the MB-SC to the SGSN; and delivering the predetermined MBMS service message to a plurality of RNCs acquired from RNC information corresponding to MBMS service identification information received from the MB-SC in an SGSN service context stored in the SGSN, the SGSN service context including the MBSM service identification information indicating the MBMS services and the RNC information indicating an RNC list where the RNCs desiring to receive each of the MBMS services are registered.

According to a third aspect of the present invention, there is provided a method for managing a service context of an individual MBMS (Multimedia Broadcast/Multicast Service) service by a radio network controller (RNC) to provide a predetermined MBMS service among a plurality of MBMS services from an MB-SC (MBMS Source Center) to at least two cells among a plurality of cells in a system including a plurality of the cells where a plurality of user equipments (UEs) are located, the RNC connected to the cells, an SGSN (Serving GPRS (General Packet Radio Service) Supporting Node) connected to the RNC, and the MB-SC connected to the SGSN. The method comprises the steps of receiving a first service request message for requesting a particular MBMS service from a particular UE among a plurality of the UEs; upon receiving the first service request message, generating a service context corresponding to the particular MBMS service, and storing service-related information required to provide the particular MBMS service to the particular UE, in the generated service context; setting up signaling connection with the SGSN for the particular MBMS service, and storing connection information for the set signaling connection in the service context; and transmitting a second service request message for requesting the particular MBMS service to the SGSN based on the connection information.

According to a fourth aspect of the present invention, there is provided a method for managing a service context of an individual MBMS (Multimedia Broadcast/Multicast Service) service by an SGSN (Serving GPRS (General Packet Radio Service) Supporting Node) to provide a predetermined MBMS service among a plurality of MBMS services from an MB-SC (MBMS Source Center) to at least two cells among a plurality of cells in a system including a plurality of the cells where a plurality of user equipments (UEs) are located, a radio network controller (RNC) connected to the cells, the SGSN connected to the RNC, and the MB-SC connected to the SGSN. The method comprises the steps of setting up signaling connection with the RNC for a particular MBMS service when a first service request message for requesting the particular MBMS service is received at the RNC from a particular UE among a plurality of the UEs; receiving a service request message for requesting the particular MBMS service from the RNC over the set signaling connection; upon receiving the service request message, generating a service context corresponding to the particular MBMS service and storing, in the generated service context, service-related information required to provide the particular MBMS service to the RNC and connection information for the set signaling connection; and transmitting a service request message for requesting the particular MBMS service to the MB-SC.

BRIEF DESCRIPTION OF THE DRAWINGS

The above and other objects, features, and advantages of the present invention will become more apparent from the following detailed description when taken in conjunction with the accompanying drawings in which:

FIG. 5 illustrates a procedure for setting up signaling connection in a conventional mobile communication system;

FIG. 6 illustrates a procedure for setting up signaling connection in a mobile communication system according to an embodiment of the present invention;

DETAILED DESCRIPTION OF THE PREFERRED EMBODIMENT

Figure 1:
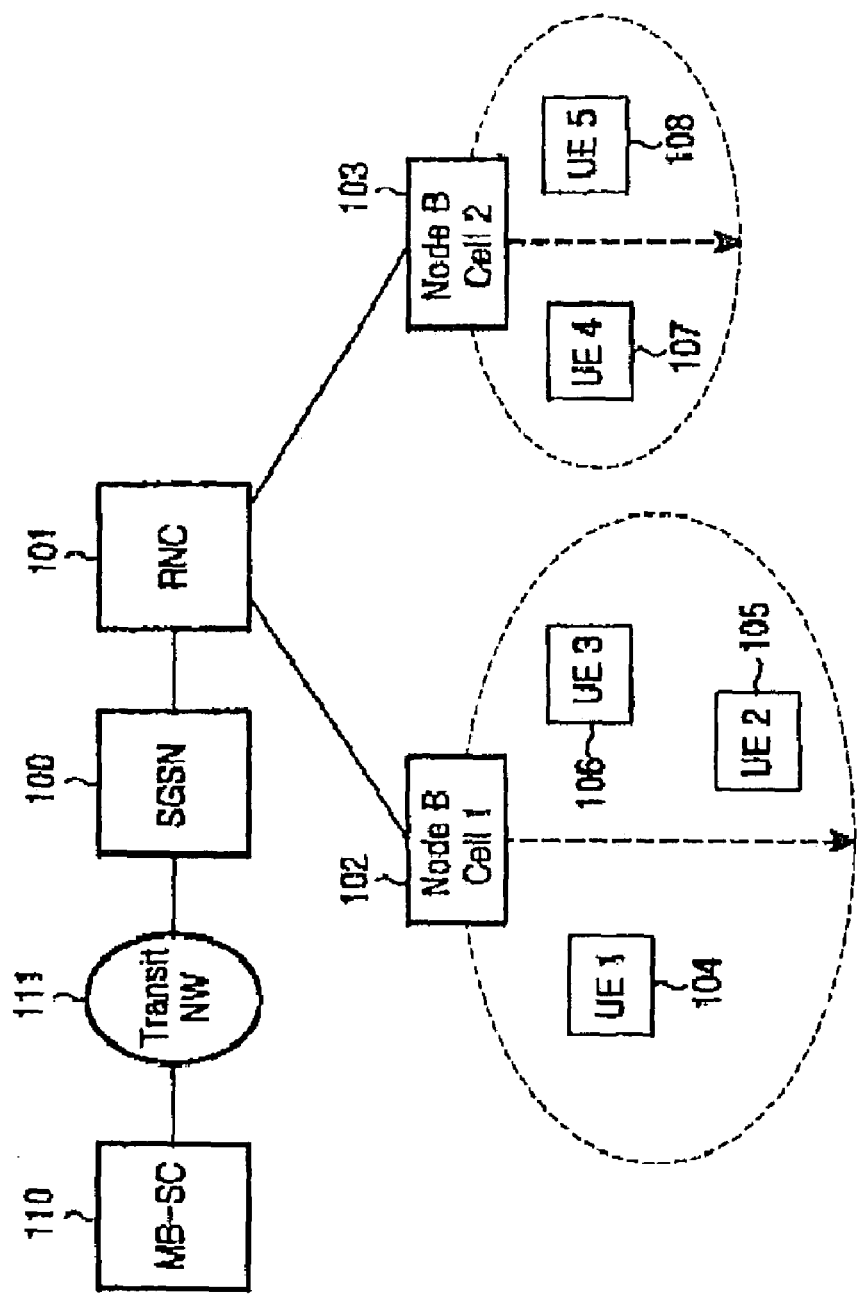
FIG. 1 illustrates a structure of a CDMA mobile communication system for an MBMS service according to an embodiment of the present invention.

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

FIG. 1 illustrates a fundamental structure of a mobile communication system to which embodiments of the present invention are to be applied. Specifically, FIG. 1 illustrates essential elements for providing an MBMS service in a CDMA mobile communication system and a relationship between the elements.

Referring to FIG. 1, UEs 104, 105, and 106 are terminal devices or subscribers that can receive MBMS data for an MBMS service from a base station (hereinafter referred to as "Node B") 102, while UEs 107 and 108 are terminal devices or subscribers that can receive MBMS data for an MBMS service from a Node B 103. The Node Bs 102 and 103 are base stations that transmit MBMS service for the MBMS service to the UEs 104, 105, 106, 107, and 108. Only one radio channel for the MBMS service is formed between the Node B 102 and the UEs 104, 105, and 106. Also, only one radio channel for the MBMS service is formed between the Node B 103 and the UEs 107 and 108. An RNC 101 is a radio network controller for controlling the Node Bs 102 and 103. The RNC 101 selectively transmits the MBMS data to a particular Node B out of the Node Bs 102 and 103, and controls a radio channel set up to provide the MBMS service. An SGSN 100 controls an MBMS service for each of the UEs 104, 105, 106, 107, and 108. Typically, the AGSN 100 manages accounting-related data of an MBMS service for each of the UEs 104, 105, 106, 107, and 108, and selectively transmits multimedia data to a particular RNC. A transmit network 111 provides a communication path between an MB-SC (MBMS Source Center) 110 and the SGSN 100, and can be comprised of a GGSN (Gateway GPRS Supporting Node) and an external network. The MB-SC 110 is a source of MBMS data for the MBMS service, and controls scheduling of the MBMS data. Though not illustrated in FIG. 1, an HLR (Home Location Register) is connected to the SGSN 100, and authenticates each of the UEs 104, 105, 106, 107, and 108.

As illustrated in FIG. 1, an MBMS data stream is delivered to the UEs 104, 105, 106, 107, and 108 via the transit network 111, the SGSN 100, the RNC 101, and the Node Bs 102 and 103. Though not illustrated in FIG. 1, a plurality of SGSNs can exist for one MBMS service, and a plurality of RNCs can exist for each of the SGSNs. In addition, the SGSN 100 must perform selective data transmission to the RNC 101, and the RNC 101 should also perform selective data transmission to the Node Bs 102 and 103. For that purpose, the RNC 101 must store a list of Node Bs to which the MBMS data stream should be transmitted. In particular, the RNC 101 manages an RNC Service Context, and the SGSN 100 manages an SGSN Service Context. A structure for managing the contexts by the RNC 101 and the SGSN 100 will be described in detail with reference to FIGS. 3 and 4. In the invention, the term "context" refers to a set of control information necessary for providing a particular MBMS service.

Figure 2:
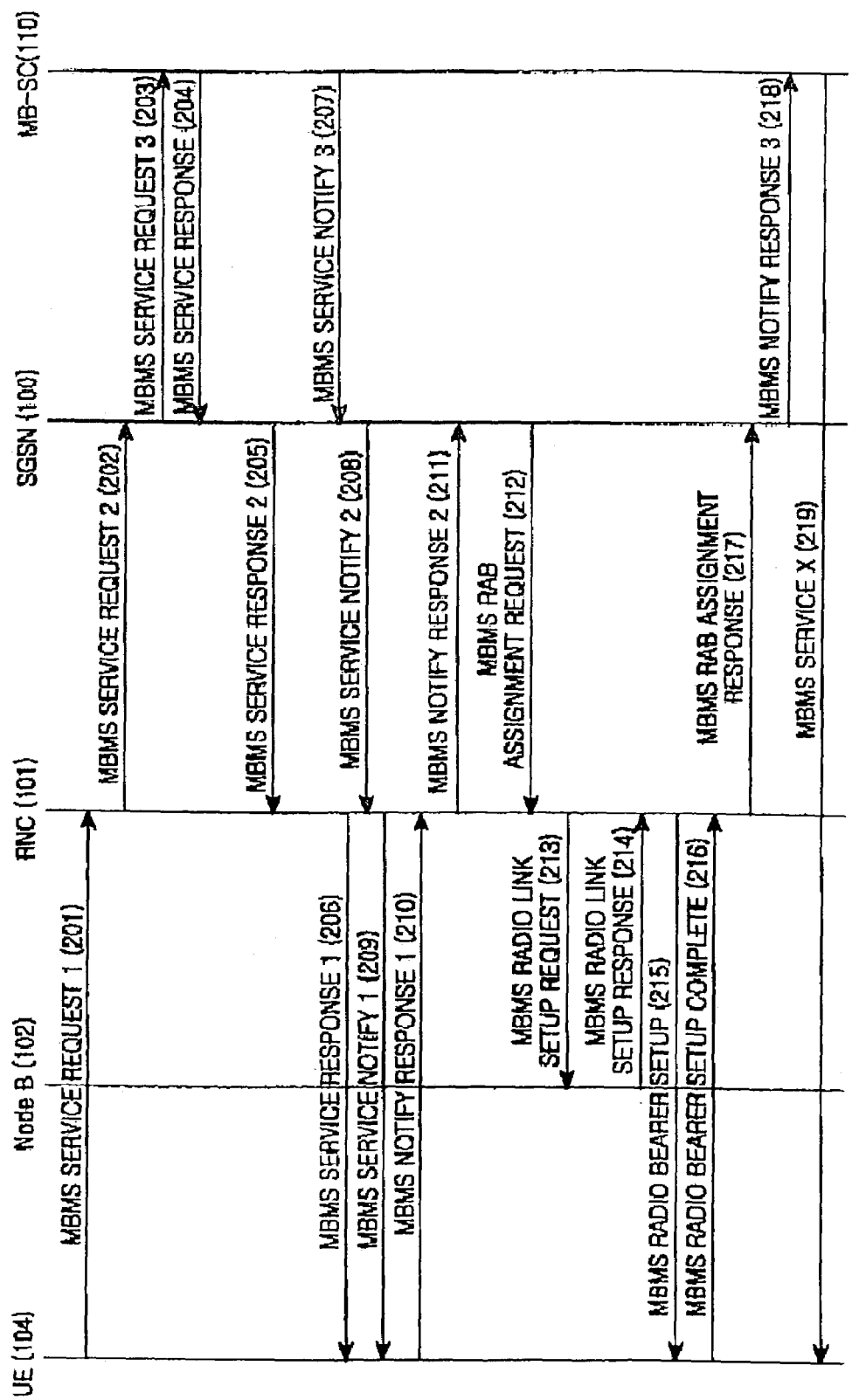
FIG. 2 illustrates a procedure for exchanging MBMS messages according to an embodiment of the present invention.

FIG. 2 illustrates a signaling procedure performed when a particular MBMS service is requested by a UE in a mobile communication system. Specifically, FIG. 2 illustrates an exchange of messages caused by the signaling procedure.

Referring to FIG. 2, in step 201, a UE transmits a first MBMS Service Request message for requesting a particular MBMS service to an RNC 101 via a corresponding Node B. The first MBMS Service Request message includes an identifier designating an MBMS service desired by the UE (hereinafter referred to as "MBMS identifier") and a user identifier for identifying a UE that transmitted the first MBMS Service Request message. Upon receiving the first MBMS Service Request message, the RNC 101 updates its RNC Service Context, and then, in step 202, transmits a second MBMS Service Request message for requesting the MBMS service to an SGSN 100. A detailed description of the RNC Service Context update process will be made later with reference to FIG. 3.

Upon receiving the second MBMS Service Request message from the RNC 101, the SGSN 100 updates its SGSN Service Context, and then transmits in step 203 a third MBMS Service Request message for requesting the MBMS service to an MB-SC 110. A detailed description of the SGSN Service Context update process will be made later with reference to FIG. 4.

Upon receiving the third MBMS Service Request message, the MB-SC 110 adds the SGSN 100 that transmitted the third MBMS Service Request message to a list of SGSNs providing the MBMS service. Thereafter, in step 204, the MB-SC 110 transmits a third MBMS Service Response message indicating normal receipt of the third MBMS Service Request message to the SGSN 100.

Upon receiving the third MBMS Service Response message, in step 205, the SGSN 100 transmits a second MBMS Service Response message indicating normal receipt of the second MBMS Service Request message to the RNC 101.

Upon receiving the second MBMS Service Response message, in step 206, the RNC 101 transmits a first MBMS Service Response message indicating normal receipt of the first MBMS Service Request message to the UE.

Steps 201 to 206 represent a process of requesting a particular MBMS service by UEs and transmitting a corresponding response to the UEs. In this case, an MBMS identifier is used as a logical identifier for identifying the MBMS service, and the RNC 101 and the SGSN 100, interposed between the UE and the MB-SC 110, generate or update a context for the MBMS service, thereby preparing to perform the MBMS service.

In step 207, if an expected start time of the MBMS service comes near, the MB-SC 110 transmits to the SGSN 100 a third MBMS Service Notify message notifying that the MBMS service will be started in the near future. The third MBMS Service Notify message is for analyzing a list of UEs desiring to receive the MBMS service, i.e., analyzing identifiers of the UEs. The third MBMS Service Notify message includes an MBMS identifier, a service start time of the MBMS service, and QoS (Quality of Service)-related information.

A considerable time delay may occur between steps 206 and 207, because the steps 206 to 207 are for verifying whether it is valid to provide the particular MBMS service, and step 207 and its succeeding steps are for providing the particular MBMS service. That is, the steps 201 to 206 can be performed long before the particular MBMS service will be provided, as the corresponding steps are for presenting a schedule of the particular MBMS service to UEs and determining how many UEs will receive the particular MBMS service, thereby determining whether to provide the corresponding MBMS service.

Upon receiving the third MBMS Service Notify message, the SGSN 100 sets up a transmission path for providing the MBMS service over the transit network 111, and updates the SGSN Service Context based on the QoS-related information. In step 208, the SGSN 100 transmits to the RNC 01 a second MBMS Service Notify message notifying that the MBMS service will be started in the near future. The second MBMS Service Notify message is for analyzing a list of UEs desiring to receive the MBMS service. The second MBMS Service Notify message includes an MBMS identifier, a service start time, and QoS-related information. Upon receiving the second MBMS Service Notify message, the RNC 101 determines identifiers of UEs existing in its RNC Service Context and a cell to which the UEs belong, and then transmits, in step 209, a first MBMS Service Notify message notifying that the MBMS service will be started in the near future, to the UEs via the Node Bs 102 and 103. The first MBMS Service Notify message includes an MBMS identifier, a service start time, and QoS-related information.

Upon receiving the first MBMS Service Notify message, each of the UEs determines whether to actually receive the MBMS service. If the UE desires to receive the MBMS service, it stores the received QoS-related information, and then, in step 210, transmits a first MBMS Notify Response message to the RNC 101 via the Node Bs 102 and 103. The first MBMS Notify Response message includes an MBMS identifier and a UE identifier. Upon receiving the first MBMS Notify Response message, the RNC 101 updates its RNC Service Context by adding thereto UE identifiers of UEs that transmitted the first MBMS Notify Response message and identifiers of cells (or Node Bs) to which the UEs belong. In step 211, the RNC 101 transmits to the SGSN 100 a second MBMS Notify Response message notifying normal receipt of the second MBMS Service Notify message. The second MBMS Notify Response message includes an MBMS identifier and a UE identifier.

It was assumed in step 210 that the RNC 101 received the first MBMS Notify Response message from one UE. However, the RNC 101 can also receive the first MBMS Notify Response messages from a plurality of UEs. In this case, the RNC 101 updates the RNC Service Context by adding thereto UE identifiers of the UEs and cell identifiers of the cells to which the UEs belong.

Upon receiving the second MBMS Notify Response message, the SGSN 100 updates its SGSN Service Context by adding thereto UE identifiers and RNC identifiers included in the second MBMS Notify Response message. In step 212, the SGSN 100 transmits to the RNC 101 an MBMS RAB Assignment Request message for setting up a transmission path, or a radio access bearer (hereinafter referred to as "RAB"), for transmitting a data stream for the MBMS service to the RNC 101 that transmitted the second MBMS Notify Response message. The MBMS RAB Assignment Request message includes an MBMS identifier, QoS information, and Iu transport bearer-related information. The Iu transport bearer-related information can include an IP (Internet Protocol) address of the SGSN 100 transmitting a message, and TEID (Tunnel Endpoint ID) corresponding to the MBMS service. Upon receiving the MBMS RAB Assignment Request message, the RNC 101 determines a cell and a UE included in its RNC Service Context, and prepares to set up a radio link to the cell, or Node B, according to the received QoS information. In step 213, the RNC 101 transmits to the Node B 102 or 103 an MBMS Radio Link Setup Request message for requesting setup of the radio link for transmitting a data stream for the MBMS service. The MBMS Radio Link Setup Request message can include channelization code information of a radio channel for transmitting a data stream for the MBMS service, scrambling code information, a slot format number, and channel coding information. Upon receiving the MBMS Radio Link Setup Request message, the Node B 102 or 103 sets up radio channels to the UEs, using the channelization code information and scrambling code information included in the MBMS Radio Link Setup Request message. In step 214, the Node B 102 or 104 transmits an MBMS Radio Link Setup Response message indicating setup of radio links, to the RNC 101.

Upon receiving the MBMS Radio Link Setup Response message, the RNC 101 transmits in step 215 an MBMS Radio Bearer Setup message for requesting setup of radio bearers, to the UEs located in a cell belonging to the Node B 102 or 103 that transmitted the MBMS Radio Link Setup Response message. The MBMS Radio Bearer Setup Response message can include physical channel-related information such as channelization code information of a radio channel over which the MBMS data is to be transmitted, and scrambling code information. In addition, the MBMS Radio Bearer Setup Response message can include transport channel-related information (or transport format-related information) and radio bared-related information (or upper layer-related information).

Upon receiving the MBMS Radio Bearer Setup message, each of the UEs forms a radio bearer, a transport channel and a physical channel, using the information included in the received MBMS Radio Bearer Setup message. In step 216, the UE transmits to the RNC 101 an MBMS Radio Bearer Setup Complete message indicating completed setup of the radio bearer. The MBMS Radio Bearer Setup Complete message includes an MBMS identifier and a UE identifier. Upon receiving the MBMS Radio Bearer Setup Complete message, the RNC 101 updates its RNC Service Context by adding thereto a UE identifier of the UE that transmitted the MBMS Radio Bearer Setup Complete message, and then transmits in step 217 an MBMS RAB Assignment Response message indicating completed setup of a transmission path for the MBMS service, to the SGSN 100. The MBMS RAB Assignment Response message can include an MBMS identifier and a UE identifier of the UE. In addition, the MBMS RAB Assignment Response message can include an IP address of the RNC 101 and TEID assigned to the MBMS service.

Upon receiving the MBMS RAB Assignment Response message, the SGSN 100 updates its SGSN Service Context by adding thereto UE identifiers included in the MBMS RAB Assignment Response message. In step 218, the SGSN 100 transmits to the MB-SC 110 a third MBMS Notify Response message indicating completed preparation for receiving the MBMS service. The third MBMS Notify Response message can include an MBMS identifier. If the MB-SC 110 receives the third MBMS Notify Response message through the steps stated above, a data stream for the particular MBMS service is provided between the MB-SC 110 and the UEs in step 219.

The entire signaling procedure for a particular MBMS service and messages therefor have been defined. However, information that must be included in the messages and a process of setting up signaling connection between the RNC 101 and the SGSN 100 must be discussed in more detail. Therefore, in the following description, reference will be made of types of information that must be included in the messages illustrated in FIG. 2, a process of generating and updating service contexts by the RNC 101 and the SGSN 100 using the information, and a method for setting up signaling connection between the RNC 101 and the SGSN 100.

1. RNC Service Context Generation and Updating

Figure 3:
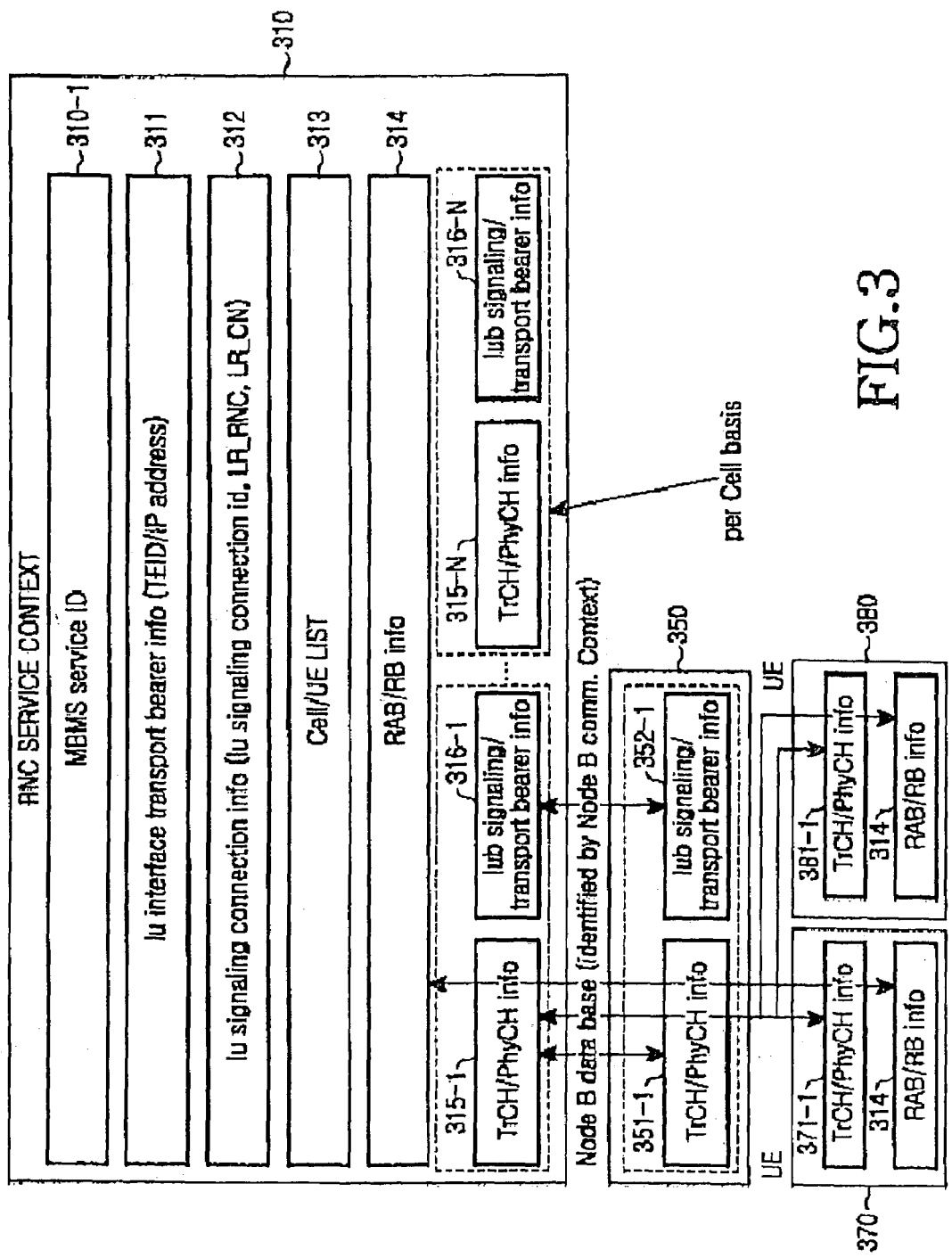
FIG. 3 illustrates a format of an RNC Service Context according to an embodiment of the present invention.

FIG. 3 illustrates a format of an RNC Service Context for a particular MBMS service, managed by the RNC 101 according to an embodiment of the present invention. A process of generating and updating each item of the RNC Service Context by the RNC 101 will according to the present invention will now be described with reference to FIG. 3.

The RNC 101 first determines whether it will generate or update each item of an RNC Service Context, based on a first MBMS Service Request message received from a particular UE. For example, the RNC 101 determines whether it will generate or update the RNC Service Context, according to presence/absence of an RNC Service Context having the same MBMS identifier as an MBMS identifier included in the first MBMS Service Request message received from the particular UE.

The first MBMS Service Request message has a format of [TYPE, MBMS Identifier, UE Identifier, Cell Identifier], and includes information shown in Table 1 below.

TABLE 1

| Information Type | Description |
| --- | --- |
| TYPE | Value indicating a type of a corresponding message |
| MBMS Identifier | Identifier of an MBMS service desired by a corresponding UE |
| UE Identifier | Identifier of a corresponding UE |
| Cell Identifier | Identifier of a cell where a corresponding UE is located |

In Table 1, "corresponding message" means the first MBMS Service Request message, and "corresponding UE" means a UE that transmitted the first MBMS Service Request message. The UE Identifier and the Cell Identifier in Table 1 can be written in the first MBMS Service Request message or can be recognized by the RNC 101 in a process of receiving the first MBMS Service Request message.

Referring to FIG. 3, first, the RNC 101 receives a first MBMS Service Request message from the particular UE, and generates a new RNC Service Context if there is no RNC Service Context 310 having the same MBMS identifier as an MBMS identifier included in the first MBMS Service Request message. If the RNC 101 is required to generate a new RNC Service Context 310 based on the first MBMS Service Request message, it performs initialization on the new RNC Service Context 310. More specifically, the RNC 101 stores an MBMS identifier included in the first MBMS Service Request message in an item 310-1, and stores a Cell identifier a UE identifier in an item 313.

Second, the RNC 101 receives a first MBMS Service Request message from the particular UE, and updates an existing RNC Service Context 310 if there is the RNC Service Context 310 having the same MBMS identifier as an MBMS identifier included in the first MBMS Service Request message. More specifically, the RNC 101 updates a UE list of the RNC Service Context 310 having the same identifier as the MBMS identifier included in the first MBMS Service Request message. That is, for updating of the UE list, the RNC 101 performs an RNC Service Context initialization process by storing a UE identifier and a cell identifier included in the first MBMS Service Request message in the item 313. After the RNC Service Context initialization process, the RNC 101 transmits a second MBMS Service Request message to an SGSN 100 (Step 202 of FIG. 2). At this point, the RNC 101 performs an Iu signaling connection updating process on the RNC Service Context 310 to newly set up In signaling connection. That is, the RNC 101 stores LR_RNC, LR_CN and an Iu signaling connection id in an item 312. A detailed description of the In signaling connection setup process will be made later with reference to FIG. 6.

The second MBMS Service Request message transmitted to the SGSN by the RNC 101 has a format of [TYPE, MBMS Identifier, UE Identifier, RNC Identifier, Iu signaling connection_MBMS id], and includes information shown in Table 2 below.

TABLE 2

| Information Type | Description |
| --- | --- |
| TYPE | Value indicating a type of a corresponding message |
| MBMS Identifier | Identifier of an MBMS service desired by an RNC |
| UE Identifier | Identifier of a corresponding UE |
| RNC Identifier | Identifier of an RNC that transmitted a corresponding message |
| Iu signaling connection_MBMS id | Identifier assigned to Iu signaling connection (Iu signaling connection_MBMS) between an RNC and an SGSN, formed per MBMS service |

In Table 2, "corresponding message" means the second MBMS Service Request message, and "corresponding UE" means a UE that requested a particular MBMS service by the second MBMS Service Request message. In Table 2, the UE Identifier is identical to the UE Identifier included in the first MBMS Service Request message, and the RNC Identifier can be written in the second MBMS Service Request message or can be recognized by the SGSN 100 in a process of receiving the second MBMS Service Request message. A detailed description of a method for assigning the Iu signaling connection_MBMS id and use of the Iu signaling connection_MBMS id will be made later with reference to FIG. 6.

After performing the UE list update process on the RNC Service Context 310, the RNC 101 can transmit an MBMS Service Update message. In this case, the RNC 101 can use the previously formed Iu signaling connection, and does not update the RNC Service Context 310 in a process of transmitting the MBMS Service Update message.

The MBMS Service Update message has a format of [TYPE, MBMS Identifier, UE Identifier(s), RNC Identifier], and includes information shown in Table 3 below.

TABLE 3

| Information Type | Description |
| --- | --- |
| TYPE | Value indicating a type of a corresponding message |
| MBMS Identifier | Identifier of an MBMS service desired by an RNC |
| UE Identifier(s) | Identifier for identifying a corresponding UE |
| RNC Identifier | Identifier for identifying a corresponding RNC |

In Table 3, "corresponding message" means the MBMS Service Update message, and "corresponding UE" means a UE corresponding to a UE identifier of the first MBMS Service Request message. In addition, "corresponding RNC" means an RNC transmitting the MBMS Service Update message. The RNC Identifier can be written in the MBMS Service Update message or can be recognized by the SGSN 100 in a process of receiving the MBMS Service Update message. The MBMS Service Update message can include a plurality of UE identifiers. For example, if it is provided that the MBMS Service Update message can be transmitted after a plurality of first MBMS Service Request messages are received, the UE identifiers may become a list of UEs that transmitted the first MBMS Service Request messages. Although transmission of the MBMS Service Update message is not illustrated in FIG. 2, the RNC 101 can transmit the MBMS Service Update message to the SGSN 100 in a situation described in conjunction with the present invention.

If a second MBMS Service Response message is received from the SGSN 100 in response to the second MBMS Service Request message, the RNC 101 performs an operation of searching an MBMS service identifier (hereinafter referred to as "MBMS identifier" for short) (Step 205 of FIG. 2). That is, the RNC 101 determines whether there is an item corresponding to the MBMS identifier of the second MBMS Service Response message, among the items 310-1 of the RNC Service Contexts 310 managed by the RNC 101.

The second MBMS Service Response message transmitted to the RNC 101 by the SGSN 100 has a format of [TYPE, MBMS Identifier, UE Identifier(s)], and includes information shown in Table 4 below.

TABLE 4

| Information Type | Description |
| --- | --- |
| TYPE | Value indicating a type of a corresponding message |
| MBMS Identifier | Identifier of an MBMS service related to a corresponding message |
| UE Identifier(s) | Identifiers of UEs that can receive a corresponding MBMS service |

In Table 4, "corresponding message" means the second MBMS Service Response message, and "corresponding MBMS service" means an MBMS service related to the second MBMS Service Response message.

The SGSN 100 can determine whether UEs included in the second MBMS Service Request message and the MBMS Service Update message are subscribers capable of receiving the corresponding MBMS service, through message exchange with an HLR. Further, the SGSN 100 can include a list of UEs having a right to receive the corresponding MBMS service through the determination process, in the second MBMS Service Response message. If the determination process is not performed, the UE identifiers are not included in the second MBMS Service Response message.

The RNC 101, which selected an appropriate RNC Service Context 310 through the MBMS identifier search process, performs secondary UE list updating on the selected RNC Service Context 310. That is, the RNC 101 represents, by "Authenticated," the UE identifiers stored in the item 313 among UE identifiers included in the second MBMS Service Response message. However, the RNC 101 represents, by "Authentication failed," the UE identifiers, which are stored in the item 313 but not included in the second MBMS Service Response message.

After performing the secondary UE list updating on the RNC Service Context 310, the RNC 101 transmits a first MBMS Service Response message having a format of [TYPE, MBMS Identifier, UE Identifier, Authentication Result] illustrated in Table 5 to the UEs included in the item 313 (Step 206 of FIG. 2).

TABLE 5

| Information Type | Description |
| --- | --- |
| TYPE | Value indicating a type of a corresponding message |
| MBMS Identifier | Identifier of an MBMS service related to a corresponding message |
| UE Identifier | Identifier of a UE scheduled to receive a corresponding message |
| Authentication Result | Same value as "Authenticated" or "Authentication failed" |

In Table 5, "corresponding message" means the first MBMS Service Response message, and the UE Identifier can be written in the first MBMS Service Response message so that the UE can recognize the UE Identifier when receiving the first MBMS Service Response message.

Upon receiving a second MBMS Service Notify message from the SGSN 100, the RNC 101 transmits a first MBMS Service Notify message to the UEs (Steps 208 and 209 of FIG. 2).

The second MBMS Service Notify message that the RNC 101 receives from the SGSN 100 has a format of [TYPE, MBMS Identifier], and includes information shown in Table 6 below.

TABLE 6

| Information Type | Description |
| --- | --- |
| TYPE | Value indicating a type of a corresponding message |
| MBMS Identifier | Identifier of an MBMS service related to a corresponding message |

In Table 6, "corresponding message" means the second MBMS Service Notify message.

Upon receiving the second MBMS Service Notify message illustrated in Table 6, the RNC 101 searches an RNC Service Context 310 corresponding to an MBMS identifier included in the received second MBMS Service Notify message, and transmits the first MBMS Service Notify message to UEs represented by "Authenticated" in the item 313 of the searched RNC Service Context 310. Here, the first MBMS Service Notify message has a format of [TYPE, MBMS Identifier], and includes information illustrated in Table 7.

TABLE 7

| Information Type | Description |
| --- | --- |
| TYPE | Value indicating a type of a corresponding message |
| MBMS Identifier | Identifier of an MBMS service related to a corresponding message |

In Table 7, "corresponding message" means the first MBMS Service Notify message.

The RNC 101 receives a first MBMS Notify Response message from the UE in response to the first MBMS Service Notify message illustrated in Table 7 (Step 210 of FIG. 2). The first MBMS Notify Response message received from the UE has a format of [TYPE, MBMS Identifier, UE Identifier], and includes information illustrated in Table 8.

TABLE 8

| Information Type | Description |
| --- | --- |
| TYPE | Value indicating a type of a corresponding message |
| MBMS Identifier | Identifier of an MBMS service related to a corresponding message |
| UE Identifier | Identifier of a UE that transmitted a corresponding message |

In Table 8, "corresponding message" means the first MBMS Notify Response message.

Upon receiving the first MBMS Notify Response message illustrated in Table 8, the RNC 101 searches an RNC Service Context corresponding to an MBMS identifier included in the first MBMS Notify Response message, and performs a UE list updating operation on the searched RNC Service Context. After completing the UE list updating operation, the RNC 101 transmits a second MBMS Notify Response message to the SGSN 100 (Step 211 of FIG. 2). At this point, the second MBMS Notify Response message is transmitted using information stored in the item 312. The second MBMS Notify Response message has a format of [TYPE, MBMS Identifier, UE Identifier(s), RNC Identifier], and includes information illustrated in Table 9 below.

TABLE 9

| Information Type | Description |
| --- | --- |
| TYPE | Value indicating a type of a corresponding message |
| MBMS Identifier | Identifier of an MBMS service desired by an RNC |
| UE Identifier(s) | Identifier of a UE capable of receiving a corresponding MBMS service |
| RNC Identifier | Identifier of a corresponding RNC |

In Table 9, "corresponding message" means the second MBMS Notify Response message, and UE Identifier(s) may include a plurality of UE identifiers corresponding to a plurality of UEs. For example, if it is provided that a plurality of second MBMS Notify Response messages can be transmitted after a plurality of first MBMS Notify Response messages are received, the UE identifiers may become a list of UEs that transmitted the first MBMS Notify Response messages.

The RNC 101 receives an MBMS RAB Assignment Request message from the SGSN 100 in response to the second MBMS Notify Response message (Step 212 of FIG.

2). The MBMS RAB Assignment Request message has a format of [TYPE, MBMS Identifier, RAB info, SGSN IP Address, TEID], and includes information shown in Table 10 below.

TABLE 10

| Information Type | Description |
| --- | --- |
| TYPE | Value indicating a type of a corresponding message |
| MBMS Identifier | Identifier of an MBMS service desired by an RNC |
| RAB info | Information on a bearer for an RAN scheduled to transmit a corresponding MBMS service |
| SGSN IP Address | IP address of an SGSN, to be used over an SGSN and an RNC |
| TEID | TEID to be used over an SGSN and an RNC |

In Table 10, "corresponding message" means the MBMS RAB Assignment Request message, and "RAN" means a radio access network. Meanwhile, "RAB info" is well disclosed in 3GPP TS 25.413 Technical Specification Group Radio Access Network; UTRAN Iu interface RANAP signaling (UMTS Spec.). In addition, "SGSN IP Address" means an IP address of an SGSN, to be used when the RAB is transmitted over Iu (SGSN and RNC), and "TEID" means TEID to be used when the RAB is transmitted over the Iu. The RNC recognizes packets having a TEID value included in a GTP-U header thereof as MBMS data. Details of SGSN IP Address and TEID are well disclosed in 3GPP TS 29.060.

Upon receiving the MBMS RAB Assignment Request message, the RNC 101 performs an RNC Service Context Iu transport bearer info updating operation, an RNC Service Context RAB/RB info updating operation, an RNC Service Context TrCH/PhyCH info updating operation, and an RNC Service Context Tub signaling/transport bearer info updating operation.

For the RNC Service Context Iu transport bearer info updating, the RNC 101 stores SGSN IP address and TEID acquired from the MBMS RAB Assignment Request message in item 311.

The RNC 101 determines RB info, TrCH/PhyCH info, and Tub signaling/transport bearer info, using the MBMS RAB Assignment Request message. The RB info is information on a radio bearer to be used for MBMS data transmission, and can include RLC and PDCP-related information. The TrCH/PhyCH info is information on a radio channel to be used for MBMS data transmission, and can include channelization code information and transport format information. Details of the RB info and the TrCH/PhyCH info are well disclosed in 3GPP TS 25.331. The Tub signaling/transport bearer info means information on a bearer of Tub (between Node B and RNC) to be used for MBMS data transmission, and can include AAL2 (ATM Adaptation Layer type 2) connection identifier information. Details of the Tub signaling/transport bearer info are well disclosed in 3GPP TS 25.433. The TrCH/PhyCH info and the Tub signaling/transport bearer info are determined according to cells stored in the item 313.

The RNC 101 updates the determined RB info, TrCH/PhyCH info and Tub signaling/transport bearer info in the RNC Service Context illustrated in FIG. 3. That is, the RNC 101 stores the RAB info of the MBMS RAB Assignment Request message and the determined RB info in an item 314 (RNC Service Context RAB/RB info updating). The RNC 101 stores the determined TrCH/PhyCH info in items 315-1 to 315-N (RNC Service Context TrCH/PhyCH info updating). The RNC 101 stores the determined Tub signaling/transport bearer info in items 316-1 to 316-N (RNC Service Context Tub signaling/transport bearer info updating).

After completing the updating processes stated above, the RNC 101 transmits an MBMS Radio Link Setup Request message to the cells stored in the item 313 (Step 213 of FIG. 2). The MBMS Radio Link Setup Request message has a format of [TYPE, MBMS Identifier, Cell Identifier, TrCH/PhyCH info], and includes information illustrated in Table 11.

TABLE 11

| Information Type | Description |
| --- | --- |
| TYPE | Value indicating a type of a corresponding message |
| MBMS Identifier | Identifier of an MBMS service desired by a corresponding Node B |
| Cell Identifier | Identifier of a Node B scheduled to transmit a corresponding MBMS service |
| TrCH/PhyCH info | TrCH/PhyCH info stored in association with a corresponding Node B |

In Table 11, "corresponding message" means the MBMS Radio Link Setup Request message, and "corresponding Node B" means a Node B scheduled to transmit the MBMS Radio Link Setup Request message. For example, when it is desired to transmit the MBMS Radio Link Setup Request message to a cell_N (or a Node B #N), the TrCH/PhyCH info is information stored in the item 31 5-N.

Thereafter, the RNC 101 receives an MBMS Radio Link Setup Response message from a particular cell (or Node B) that transmitted the MBMS Radio Link Setup Request message (Step 214 of FIG. 2). In reply, the RNC 101 transmits an MBMS Radio Bearer Setup message to UEs located in cells (or Node Bs) stored in a Cell list 313 (Step 215 of FIG. 2). The MBMS Radio Bearer Setup message has a format of [TYPE, MBMS Identifier, UE Identifier, RAB/RB info, TrCH/PhyCH info], and includes information shown in Table 12.

TABLE 12

| Information Type | Description |
| --- | --- |
| TYPE | Value indicating a type of a corresponding message |
| MBMS Identifier | Identifier of an MBMS service desired by a corresponding UE |
| UE Identifier | Identifier of a UE scheduled to transmit a corresponding message |
| RAB/RB info | RAB/RB info stored in association with a corresponding Node B |
| TrCH/PhyCH info | TrCH/PhyCH info stored in association with a corresponding Node B |

In Table 12, "corresponding message" means the MBMS Radio Bearer Setup message. If UEs scheduled to receive the MBMS Radio Bearer Setup message are located in a cell_N (or a Node B #N), the TrCH/PhyCH info is identical to the information stored in the item 315-N, and the RAB/RB info is identical to the information stored in the item 314.

The RNC 101 receives an MBMS Radio Bearer Setup Complete message from the UEs in response to the MBMS Radio Bearer Setup message (Step 216 of FIG. 2). Upon receiving the MBMS Radio Bearer Setup Complete message, the RNC 101 performs a process of updating a UE list of its RNC Service Context, and transmits an MBMS RAB Assignment Response message to the SGSN 100 (Step 217 of FIG. 2). The MBMS RAB Assignment Response message has a format of [TYPE, MBMS Identifier, UE Identifier(s), RNC IP Address, TEID], and includes information illustrated in Table 13.

TABLE 13

| Information Type | Description |
| --- | --- |
| TYPE | Value indicating a type of a corresponding message |
| MBMS Identifier | Identifier of a desired MBMS service |
| UE Identifier(s) | Identifier of UEs desiring to receive a corresponding MBMS service |
| RNC IP Address | IP address of an RNC, to be used over an SGSN and an RNC |
| TEID | TEID to be used over an SGSN and an RNC |

In Table 13, "corresponding message" means the MBMS RAB Assignment Response message, and UE identifiers corresponding to a plurality of UEs can be recorded in UE Identifier(s). For example, if it is provided that a plurality of MBMS RAB Assignment Response messages can be transmitted after a plurality of MBMS Radio Bearer Setup Complete messages are received, the UE identifiers may become a list of UEs that transmitted the MBMS Radio Bearer Setup Complete messages.

The RNC 101 determines TEID to be used for a corresponding MBMS service before transmitting the MBMS RAB Assignment Response messages, and includes the corresponding information in the MBMS Radio Bearer Setup Complete messages. The TEID can be differently set when it is transmitted from the RNC 101 to the SGSN 100 or when it is transmitted from the SGSN 100 to the RNC 101. Therefore, TEID transmitted through the MBMS RAB Assignment Response message can be different from TEID transmitted through the MBMS RAB Assignment Request message. In addition, the RNC 101 performs an operation of updating Iu transport bearer info of the RNC Service Context before transmitting the MBMS RAB Assignment Response message.

In the above-stated embodiment of the present invention, a detailed description has been made of an RNC operation related to generation and updating of an RNC Service Context.

2. SGSN Service Context Generation and Updating

Figure 4:
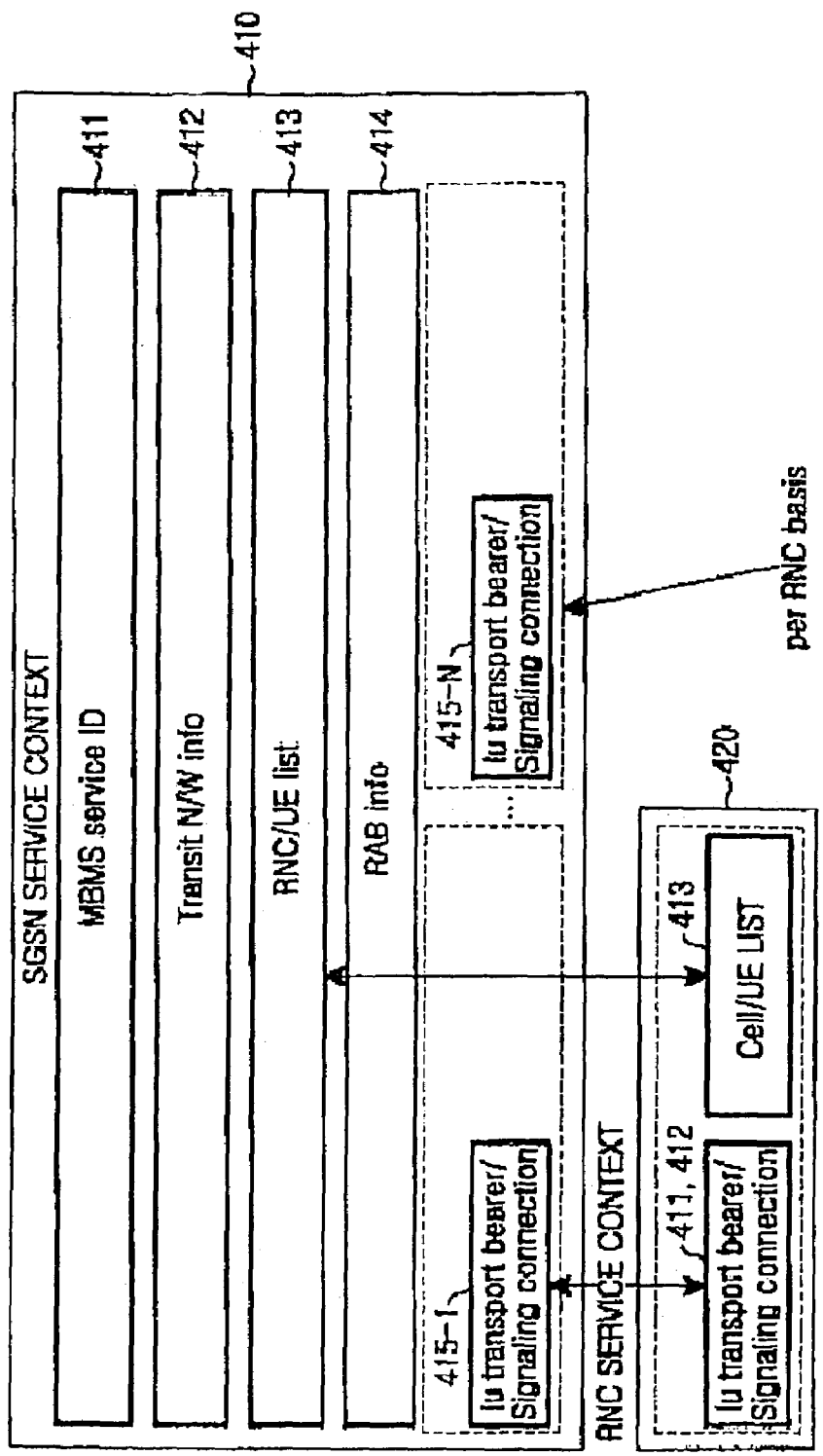
FIG. 4 illustrates a format of an SGSN Service Context according to an embodiment of the present invention.
Figure 7:
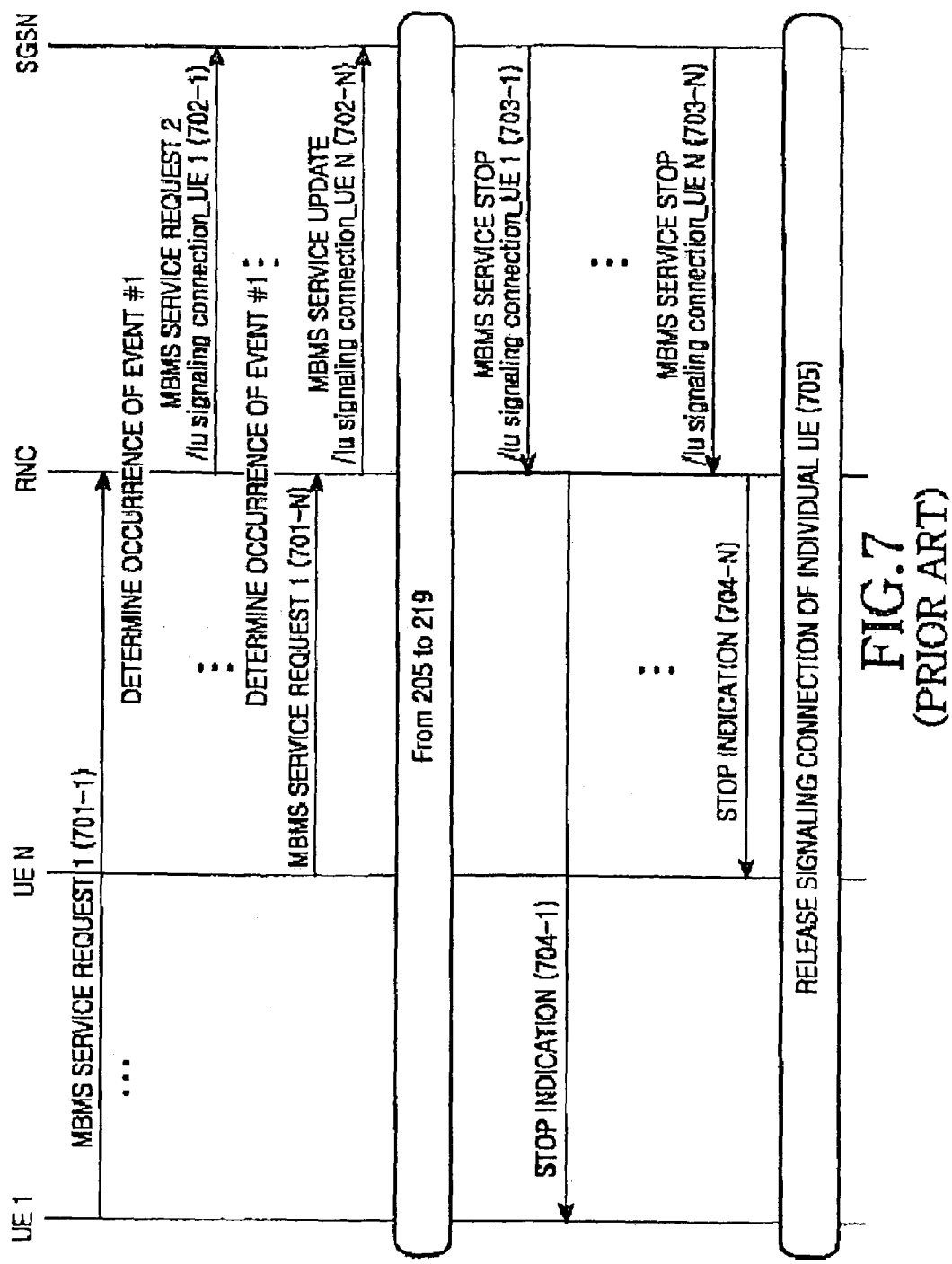
FIG. 7 illustrates a signaling procedure for setting up and releasing signaling connection in a conventional mobile communication system.

FIG. 4 illustrates a format of an SGSN Service Context for a particular MBMS service, managed by an SGSN 100 according to an embodiment of the present invention. A process of generating and updating each item of the SGSN Service Context by the SGSN 100 according to the present invention will now be -described with reference to FIG. 4.

The SGSN 100 first determines whether it will generate or update each item of an SGSN Service Context, based on a second MBMS Service Request message received from an RNC 101. For example, the SGSN 100 determines whether it will generate or update the SGSN Service Context, according to presence/absence of an SGSN Service Context having the same MBMS identifier as an MBMS identifier included in the second MBMS Service Request message received from the RNC 101. The second MBMS Service Request message has the same format and information as those illustrated in Table 2.

In FIG. 4, first, the SGSN 100 receives a second MBMS Service Request message from the RNC 101, and generates a new SGSN Service Context if there is no SGSN Service Context 410 having the same MBMS identifier as an MBMS identifier included in the second MBMS Service Request message. If the SGSN 100 is required to generate a new SGSN Service Context 410 based on the second MBMS Service Request message, it performs initialization on the new RNC Service Context 410. More specifically, the SGSN 100 stores an MBMS identifier included in the second MBMS Service Request message in an item 411, and stores an RNC identifier and a UE identifier in an item 413.

Second, the SGSN 100 receives a second MBMS Service Request message from the RNC 101, and updates an existing SGSN Service Context 410 if there exists the SGSN Service Context 410 having the same MBMS identifier as an MBMS identifier included in the second MBMS Service Request message. More specifically, if there is an SGSN Service Context 410 having the same MBMS identifier as an MBMS identifier included in the second MBMS Service Request message, the SGSN 100 updates Iu signaling connection information of the SGSN Service Context 410 in order to newly set up Iu signaling connection. That is, the SGSN 100 stores LR_RNC, LR_CN, and Iu signaling connection id_MBMS in items 415-1 to 415-N of FIG. 4. The reference numeral 415-N indicates that the process of updating Iu signaling connection information of the SGSN Service Context 410 was initiated by the first MBMS Service Request message transmitted by an RNC #N.

Upon receiving an MBMS Service Update message from the RNC 101, the SGSN 100 performs an 'SGSN Service Context UE list updating' operation to update a UE list of the SGSN Service Context 410. That is, in order to update the UE list, the SGSN 100 performs an SGSN Service Context initialization process by storing a UE identifier and an RNC identifier included in the MBMS Service Update message in the item 413 of the SGSN Service Context 410. After performing the SGSN Service Context initialization process, the SGSN 100 transmits a third MBMS Service Request message to an MB-SC 110 via a transit network 111 (Step 20 of FIG. 2). At this point, the SGSN 100 also performs an 'SGSN Service Context transit N/W info updating' operation to store transit N/W info in an item 412. The "transit N/W info" can include address information and logical identifier information related to the next Node B in the transit N/W.

The third MBMS Service Request message has a format of [TYPE, MBMS Identifier, UE Identifier, SGSN Identifier], and includes information illustrated in Table 14 below.

TABLE 14

| Information Type | Description |
| --- | --- |
| TYPE | Value indicating a type of a corresponding message |
| MBMS Identifier | Identifier of an MBMS service desired by an SGSN |
| UE Identifier | Identifier of a corresponding UE |
| SGSN Identifier | Identifier of a corresponding SGSN |

In Table 14, "corresponding message" means the third MBMS Service Request message, and "corresponding UE" means a UE corresponding to a UE identifier of the first MBMS Service Request message. The UE identifier is transmitted along with the third MBMS Service Request message only when the MB-SC 110 must know a list of UEs receiving the corresponding MBMS service. Further, "corresponding SGSN" refers to an SGSN transmitting the MBMS Service Update message.

The SGSN 100 determines whether UEs included in the second MBMS Service Request message and the MBMS Service Update message are subscribers capable of receiving the corresponding MBMS service. The SGSN 100 can determine whether the UEs are subscribers capable of receiving the corresponding MBMS service, through message exchange with an HLR. In this case, the SGSN 100 performs an 'SGSN Service Context UE list update type #2' operation. If it is determined that the UEs are available subscribers capable of receiving the corresponding MBMS service, the 'SGSN Service Context UE list update type #2' operation represents the available subscribers by 'Authenticated' in the item 413. However, if it is determined that the UEs are not available subscribers, the 'SGSN Service Context UE list update type #2' operation represents the subscribers by 'Authentication failed' in the item 413.

After completing the 'SGSN Service Context UE list update type #2' operation, the SGSN 100 receives a third MBMS Service Response message from the MB-SC 110 via the transit network 111 (Step 204 of FIG. 2). Upon receiving the third MBMS Service Response message, the SGSN 100 performs MBMS identifier search. The MBMS identifier search is performed to determine whether there is any item having the same MBMS identifier as an MBMS identifier included in the third MBMS Service Response message among the items 411 of the SGSN Service Context managed by the SGSN 100.

The third MBMS Service Response message has a format of [TYPE, MBMS Identifier, SGSN Identifier], and includes information illustrated in Table 15 below.

TABLE 15

| Information Type | Description |
| --- | --- |
| TYPE | Value indicating a type of a corresponding message |
| MBMS Identifier | Identifier of an MBMS service desired by a corresponding SGSN |
| SGSN Identifier | Identifier of a corresponding SGSN |

In Table 15, "corresponding message" refers to the third MBMS Service Response message.

When the MBMS identifier search is completed, the SGSN 100 transmits a second MBMS Service Response message to RNCs 101 included in the item 413 (Step 205 of FIG. 2). The second MBMS Service Response message has the same format and information as those illustrated in Table 4. The SGSN 100 can transmit UE identifiers represented by 'Authenticated' in the item 413 along with the second MBMS Service Response message.

Upon receiving a third MBMS Service Notify message from the MB-SC 110 via the transit network 111, the SGSN 100 determines RNCs 101 including UEs represented by 'Authenticated' in the item 413 of the SGSN Service Context. Thereafter, the SGSN 100 transmits a second MBMS Service Notify message to the determined RNCs 101 (Step 208 of FIG. 2). The second MBMS Service Notify message has the same format and information as those illustrated in Table 6, and the third MBMS Service Notify message has a format and information illustrated in Table 16 below.

TABLE 16

| Information Type | Description |
| --- | --- |
| TYPE | Value indicating a type of a corresponding message |
| MBMS Identifier | Identifier of an MBMS service desired by a corresponding SGSN |

In Table 16, "corresponding message" refers to the third MBMS Service Notify message.

Upon receiving the second MBMS Service Notify message, the RNC 101 transmits a second MBMS Service Notify Response message to the SGSN 100 as described above (Step 211 of FIG. 2). Upon receiving the second MBMS Service Notify Response message having the format shown in Table 9, the SGSN 100 performs an operation of updating a UE list of the SGSN Service Context illustrated in FIG. 4.

When the UE list updating operation is completed, the SGSN 100 transmits an MBMS RAB Assignment Request message to RNCs 101 stored in the item 413. The MBMS RAB Assignment Request message has the format and information illustrated in Table 10. At this point, the SGSN 100 determines Iu transport bearer-related information 415-1 to 415-N, and performs an Iu transport bearer info updating operation on the SGSN Service Context based on the determined Iu transport bearer-related information. Thereafter, the SGSN 100 can transmit the determined Iu transport bearer-related information to the RNCs 101 stored in the item 413 through the MBMS RAB Assignment Request message. The Iu transport bearer-related information can include SGSN IP address and TEID. The MBMS RAB Assignment Request message has the format and information illustrated in Table 10.

In addition, the SGSN 100 performs an 'SGSN Service Context RAB info updating' operation for determining RAB information to be applied to the MBMS service and storing the determined RAB information in an item 414, and then delivers the RAB information to the RNCs 101, using the MBMS RAB Assignment Request message (Step 212 of FIG. 2).

The SGSN 100 receives an MBMS RAB Assignment Response message from the RNCs 101 in response to the MBMS RAB Assignment Request message (Step 217 of FIG. 2). The MBMS RAB Assignment Response message has the same format and information as those illustrated in Table 13. Upon receiving the MBMS RAB Assignment Response message, the SGSN 100 performs an 'SGSN Service Context Iu transport bearer info updating' process and an 'SGSN Service Context UE list updating' process. After performing these two processes, the SGSN 100 transmits a third MBMS Notify Response message to the MB-SC 110 via the transit network 111 in response to the third MBMS Service Notify message (Step 218 of FIG. 2). The third MBMS Notify Response message has a format of [TYPE, MBMS Identifier, SGSN Identifier], and includes information shown in Table 17.

TABLE 17

| Information Type | Description |
| --- | --- |
| TYPE | Value indicating a type of a corresponding message |
| MBMS Identifier | Identifier of an MBMS service desired by a corresponding SGSN |
| SGSN Identifier | Identifier of a corresponding SGSN |

3. Signaling Connection Setup between RNC and SGSN

A description of an Iu signaling connection will be made with reference to FIG. 6. The above-stated second MBMS Service Request message, second MBMS Service Response message, second MBMS Service Notify message, second MBMS Notify Response message, MBMS RAB Assignment Request message, and MBMS RAB Assignment Response message are RANAP messages, and are transmitted from an RNC to an SRNC as upstream data, or transmitted from an SGSN to an RNC as downstream data through SCCP connection formed in a lower layer.

An operation of setting up an SCCP connection and associating the set SCCP connection with a particular UE in order to transmit RANAP messages as upstream or downstream data is called "Iu signaling connection." In the present invention, the Iu signaling connection setup is initiated for an individual service by an RNC upon receiving a first MBMS Service Request message.

In the following description, the present invention provides a method for separately forming Iu signaling connection for transmitting/receiving MBMS-related RANAP messages in order to solve an inefficiency problem caused by individually transmitting the same message to all UEs.

FIG. 6 illustrates a process of setting up an Iu signaling connection according to an embodiment of the present invention. If an event #2 occurs, an RNC prepares to set up Iu signaling connection. The event #2 means an event in which an MBMS-related message to be transmitted to a core network (hereinafter referred to as "CN") has arrived before signaling connection for a particular MBMS service is set up between an RNC and the CN. Typically, the event #2 represents an event where although a particular UE has delivered a first MBMS Service Request message to a particular RNC, the RNC has no signaling connection for an MBMS service indicated by the first MBMS Service Request message. At this point, the RNC sets up an Iu signaling connection for the MBMS service and then transmits a second MBMS Service Request message to the CN, i.e., an SGSN.

Referring to FIG. 6, if the event #2 occurs in step 601, an RNC 610 forms an Initial UE Message based on a message that caused the event #2. The Initial Service Message refers to a message formed by an RANAP layer 611 due to occurrence of the event #2, and a second MBMS Service Request message belongs to the Initial Service Message. Because a message belonging to the Initial Service Message includes only the second MBMS Service Request message, it will be assumed herein that the Initial Service Message and the second MBMS Service Request message are the same message.

Specifically, the event #2 occurs when although the RNC has received the first MBMS Service Request message and performed MBMS identifier search using an MBMS identifier included in the first MBMS Service Request message, there is no RNC Service Context corresponding to the MBMS identifier.

After recognizing an occurrence of the event #2, the RNC performs an RNC Service Context initialization operation, and determines an Iu signaling connection id to be used to transmit/receive RANAP messages related to the MBMS service. In step 602, the RANAP layer 611 forms an Initial Service Message as the second MBMS Service Request message using the determined Iu signaling connection id, and delivers the formed Initial Service Message to an SCCP layer 612. The SCCP layer 612 of the RNC 610 forms an SCCP message called CR, and transmits the formed SCCP message to an SCCP layer 622 of a CN 620 in step 603.

$$CR=[LR\_RNC, \text{Initial UE Message}] \quad (5)$$

A method for determining LR_RNC used for the CR message and an Iu signaling connection id included in the Initial Service Message is to the same as in the conventional method.

Upon receiving the CR message, the SCCP layer 622 of the CN 620 delivers in step 604 an initial service message included in a payload part of the CR message to an RANAP layer 621 and assigns LR_CN. The RANAP layer 621 of the CN 620 performs an MBMS identifier search operation using the delivered initial service message. If there is no SGSN Service Context having the same MBMS identifier as an MBMS identifier included in the received message, the RANAP layer 621 performs an SGSN Service Context initialization process.

In addition, the RANAP layer 621 of the CN 620 stores an Iu signaling connection id included in the initial service message, and transmits an RANAP message, if any, to the SCCP layer 622 in step 605. However, if there is no RANAP message to send, step 605 can be omitted. In step 604, the SCCP layer 622 forms an SCCP message called CC, using the determined LR_CN, and transmits the formed SCCP message to the RNC 610 in step 606.

$$CC=[LR\_CN, LR\_RNC, \text{RANAP Message}] \text{ (existing} \\ \text{only when step 505 is performed)} \quad (6)$$

After completing the above process, the CN 620 performs an SGSN Service Context Iu signaling connection info updating operation. That is, the CN 620 stores the Iu signaling connection id, the LR_CN and the LR_RNC in the items 415-1 to 415-N of the SGSN Service Context 410 illustrated in FIG. 4.

The SCCP layer 612 of the RNC 610 stores LR_CN included in the received CC message. If a RANAP message was included in the CC message, the SCCP layer 612 delivers the RANAP message to the RANAP layer 611 in step 607.

After completing this process, the RNC 610 performs an RNC Service Context Iu signaling connection info updating operation. That is, the RNC 610 stores Iu signaling connection id, LR_RNC and LR_CN in the item 312 of the RNC Service Context 310 illustrated in FIG. 3. Thereafter, when transmitting control information for the MBMS service, the RNC 610 forms an SCCP message using the LR_RNC and LR_CN stored in the item 312, and transmits the formed SCCP message. It is possible to determine an MBMS service corresponding to a received RANAP message, using the LR_RNC and LR_CN of the received SCCP message.

Figure 8:
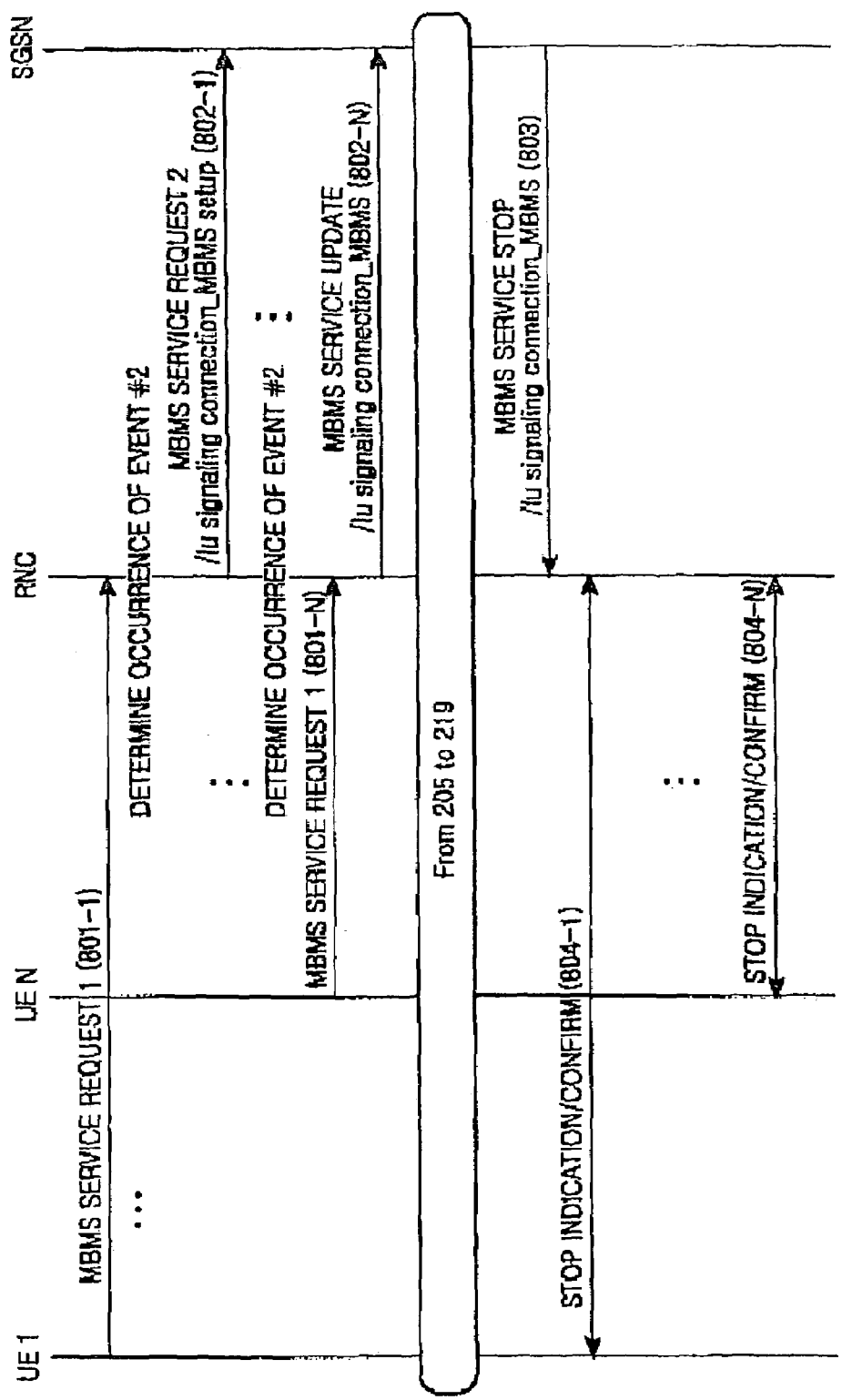
FIG. 8 illustrates a signaling procedure for setting up and releasing signaling connection in a mobile communication system according to an embodiment of the present invention.

FIG. 8 illustrates a signaling procedure for setting up and releasing Iu signaling connection according to an embodiment of the present invention. It will be assumed in FIG. 8 that N UEs of UE #1 to UE #N exist in a particular RNC area, and each of the UEs desires to request a particular MBMS service.

Referring to FIG. 8, if each of the UEs transmits a first MBMS Service Request message to the RNC in steps 801-1 to 801-N, the RNC receives the first MBMS Service Request messages and determines whether an event #2 has occurred. If the first MBMS Service Request message received in step 801-1 causes the event #2, the RNC performs an RNC Service Context initialization process. As described in conjunction with FIG. 6, the RNC sets up Iu signaling connection and then transmits in step 802-1 a second MBMS Service Request message to an SGSN. Even for the first MBMS Service Request messages received in steps 801-2 to 802-N, the RNC determines whether the event #2 has occurred. That is, the RNC performs an MBMS identifier search process, using an MBMS identifier included in each of the received first MBMS Service Request messages. The first MBMS Service Request messages that the UE #2 to UE #N transmitted, do not cause the event #2. Not to cause the event #2 means that In signaling connection-related information is stored in the item 312 of the RNC Service Context 310 illustrated in FIG. 3. Therefore, in steps 802-2 to 802-N, the RNC transmits MBMS Service Update messages in response to the first MBMS Service Request messages over Iu signaling connection set up in steps 801-1 and 802-1.

A procedure for transmitting the corresponding MBMS service to the UE #1 to UE #N has already been described with reference to FIG. 2, so a description thereof will be omitted here.

The SGSN must notify the RNC, if the corresponding MBMS service is ended while the corresponding MBMS service is normally being provided to the UE #1 to UE #N. For that purpose, the SGSN delivers a RANAP message of an MBMS Service Stop message to all UEs receiving the MBMS service.

MBMS Service Stop=[TYPE, MBMS Identifier]  (7)

In step 803, the SGSN transmits the MBMS Service Stop message to the RNC over Iu signaling connection formed for the MBMS service. That is, the MBMS Service Stop message is transmitted to the RNC over Iu signaling connections formed in steps 801-1 to 802-1. The RNC converts the MBMS Service Stop message received from the SGSN into an appropriate RRC message, and transmits the converted RRC message to each of the UEs in steps 804-1 to 804-N. For example, a Stop Indication message below can be used as the RRC message.

Stop Indication=[TYPE, MBMS Identifier]  (8)

Each of the UEs stops the corresponding MBMS service by the Stop Indication message provided from the RNC.

4. Operation

Figure 9:
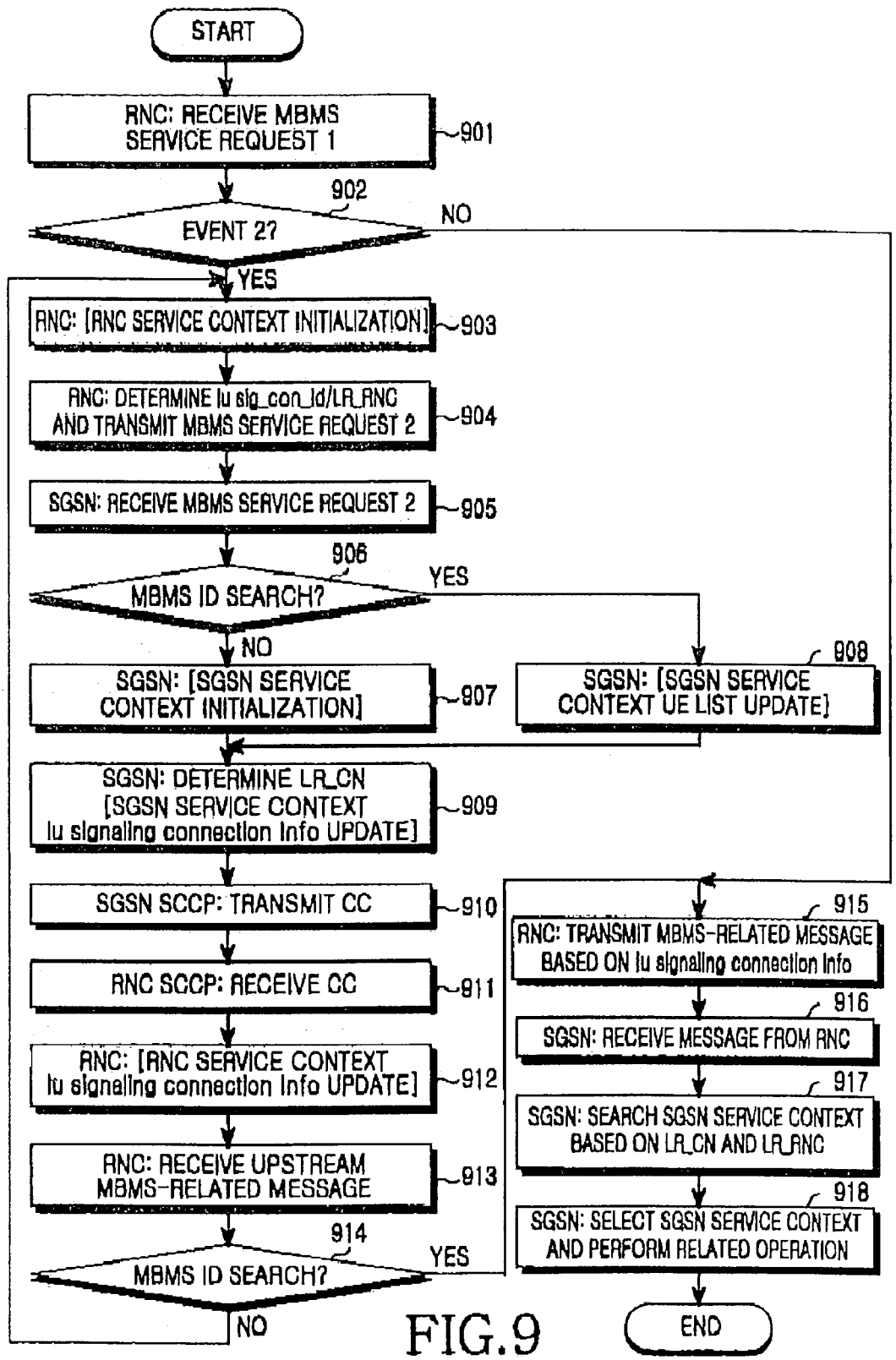
FIG. 9 is a flowchart illustrating an operation of an RNC and an SGSN according to an embodiment of the present invention.

FIG. 9 illustrates a signaling procedure for setting up Iu signaling connection, transmitting/receiving a RANAP message, and updating a Service Context in a mobile communication system according to an embodiment of the present invention. The signaling procedure illustrated in FIG. 9 is performed on each of the MBMS services provided in a mobile communication system.

Referring to FIG. 9, in step 901, an RNC receives a first MBMS Service Request message for requesting a corresponding MBMS service from a particular UE. In step 902, the RNC determines whether an event #2 has occurred by the first MBMS Service Request message. If it is determined that the event #2 has occurred, the RNC proceeds to step 903. However, if it is determined that the event #2 has not occurred, the RNC proceeds to step, 915.

In step 903, the RNC performs an RNC Service Context initialization process. If the RNC Service Context initialization process is completed, the RNC determines in step 904 an Iu signaling connection id and LR_RNC, forms a second MBMS Service Request message, and transmits the second MBMS Service Request message to an SGSN, as described in conjunction with FIG. 6. The second MBMS Service Request message can be transmitted to the SGSN as a CR message with the determined information.

The SGSN receives the second MBMS Service Request message from the RNC in step 905, and performs an MBMS identifier search process in step 906. That is, in the MBMS identifier search process, the SGSN analyzes an MBMS identifier included in the second MBMS Service Request message and determines whether there is any SGSN Service Context corresponding to the MBMS identifier. If there is no SGSN Service Context corresponding to the MBMS identifier in step 906, the SGSN proceeds to step 907. However, if there exists an SGSN Service Context corresponding to the MBMS identifier, the SGSN proceeds to step 908. In step 907, the SGSN performs an SGSN Service Context initialization process. In step 908, the SGSN performs an SGSN Service Context UE list updating operation. After completing the SGSN -Service Context initialization process or the SGSN Service Context UE list updating operation, the SGSN proceeds to step 909.

In step 909, the SGSN determines LR_CN as described in conjunction with FIG. 6, and performs an SGSN Service Context Iu signaling connection info updating operation. In step 910, the SGSN forms a CC message using the determined LR_CN and transmits the CC message to the RNC.

In step 911, the RNC receives the CC message transmitted from the SGSN. In step 912, the RNC analyzes the Iu signaling connection id, the LR_RNC, and the LR_CN included in the received CC message, and performs an RNC Service Context Iu signaling connection info updating operation, using the analyzed information.

When the signaling procedure of up to step 912 has been performed, Iu signaling connection for the MBMS service is completely formed between the SGSN and the RNC.

Thereafter, if an MBMS-related message is received from the CN (or SGSN) in step 913, the RNC proceeds to step 914. The MBMS-related message includes an MBMS Service Update message, a second MBMS Notify Response message, and an MBMS RAB Assignment Response message. In step 914, the RNC implements an MBMS identifier search process. That is, the RNC analyzes an MBMS identifier included in the MBMS-related message, and determines whether there is any RNC Service Context corresponding to the analyzed MBMS identifier. If it is determined that there is an RNC Service Context corresponding to the MBMS identifier in the MBMS identifier search process, the RNC proceeds to step 915. However, it is determined that there is no RNC Service Context corresponding to the MBMS identifier in the MBMS identifier search process, the RNC returns to step 903. Absence of an RNC Service Context corresponding to the MBMS identifier indicates an occurrence of event #2.

In step 915, following step 902 or 914, the RNC forms the MBMS-related message as an SCCP message, using LR_RNC and LR_CN included in Iu signaling connection info of a corresponding RNC Service Context, and transmits the SCCP message to the SGSN. The SGSN receives the SCCP message from the RNC in step 916, and searches the SGSN Service Context based on the LR_CN and LR_RNC included in the SCCP message in step 917. That is, the SGSN determines whether there is any SGSN Service Context corresponding to the LR_CN and LR_RNC. In step 918, the SGSN selects an SGSN Service Context according to the search result, and performs a related operation on the selected SGSN Service Context based on the information included in the MBMS-related message. For example, if the MBMS-related message received in step 916 is an MBMS Service Update message, the SGSN will perform an SGSN Service Context UE list updating operation in step 918.

Steps 901 to 918 will continue until the MBMS service is ended.

In addition, steps 913 to 918 are applied even to transmission of a downstream MBMS-related message transmitted from the SGSN to the RNC. That is, if the SGSN receives an MBMS-related message from a transit N/W, the SGSN first performs an MBMS identifier search operation, thereby recognizing a related SGSN Service Context. Thereafter, the SGSN forms the MBMS-related message as an SCCP message according to Iu signaling connection info of the recognized SGSN Service Context, and transmits the SCCP message to the RNC. The RNC recognizes a related RNC Service Context using LR_RNC and LR_CN of the SCCP message, and updates the recognized RNC Service Context according to information on the received MBMS-related message. For example, if the downstream MBMS-related message is a second MBMS Service Response message, the RNC will perform an RNC Service Context UE list update type #2 operation.

As described above, the present invention can simplify a signaling connection procedure required to provide an MBMS service in a mobile communication system, thereby efficiently providing the MBMS service. Also, the invention simplifies a procedure for providing an MBMS service in a mobile communication system, thereby contributing to a decrease in a load of the mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for providing a predetermined MBMS (Multimedia Broadcast/Multicast Service) service to at least two cells among a plurality of cells desiring to receive a predetermined MBMS service among a plurality of MBMS services from an MB-SC (MBMS Source Center) in a system including a radio network controller (RNC) connected to the plurality of the cells, an SGSN (Serving GPRS (General Packet Radio Service) Supporting Node) connected to the RNC, and the MB-SC connected to the SGSN, the method comprising the steps of:

transmitting, from the SGSN to the RNC, an MBMS service message including service identification information indicating the predetermined MBMS service; and delivering the predetermined MBMS service message to the plurality of the cells acquired from cell information corresponding to MBMS service identification information received from the SGSN in an RNC service context stored in the RNC, the RNC service context including the MBMS service identification information indicating the MBMS services and the cell information indicating a cell list where cells desiring to receive each of the MBMS services are registered.

2. The method of claim 1, wherein the RNC service context is generated when an MBMS service is first requested, and the RNC service context is released when the MBMS service is ended.

3. The method of claim 2, wherein the RNC service context is updated when the MBMS service is requested by at least one other UE among the plurality of UEs located in the cells.

4. A method for providing a predetermined MBMS (Multimedia Broadcast/Multicast Service) service to at least two cells among a plurality of cells desiring to receive the predetermined MBMS service among a plurality of MBMS services from an MB-SC (MBMS Source Center) in a radio network controller (RNC) connected to the plurality of the cells, an SGSN (Serving GPRS (General Packet Radio Service) Supporting Node) connected to the RNC, and the MB-SC connected to the SGSN, the method comprising the steps of:

transmitting, from the MB-SC to the SGSN, an MBMS service message including service identification information indicating the predetermined MBMS service; and delivering the predetermined MBMS service message to a plurality of RNCs acquired from RNC information corresponding to MBMS service identification information received from the MB-SC in an SGSN service context stored in the SGSN, the SGSN service context including the MBSM service identification information indicating the MBMS services and the RNC information indicating an RNC list where RNCs desiring to receive each of the MBMS services are registered.

5. The method of claim 4, wherein the SGSN service context is generated when an MBMS service is first requested by the RNC, and the SGSN service context is released when the MBMS service is ended.

6. The method of claim 5, wherein the RNC service context is updated when the RNC information is modified.

7. A method for managing a service context of an individual MBMS (Multimedia Broadcast/Multicast Service) service by a radio network controller (RNC) to provide a predetermined MBMS service among a plurality of MBMS services from an MB-SC (MBMS Source Center) to plural cells among a plurality of cells in a system including the plurality of the cells where a plurality of user equipments (UEs) are located, the RNC connected to the cells, an SGSN (Serving GPRS (General Packet Radio Service) Supporting Node) connected to the RNC, and the MB-SC connected to the SGSN, the method comprising the steps of:

receiving a first service request message for requesting an MBMS service;

generating a service context corresponding to the MBMS service, and storing service-related information required to provide the MBMS service to an UE, which has requested the MBMS service, in the generated service context;

setting up a signaling connection with the SGSN for the MBMS service, and storing connection information for the set signaling connection in the service context; and transmitting a second service request message for requesting the MBMS service to the SGSN based on the connection information.

8. The method of claim 7, wherein the first service request message includes an identifier of the MBMS, an identifier of the UE, and an identifier of a cell to which the UE belongs, and the second service request message includes an identifier of the MBMS, an identifier of the UE, an identifier of the RNC, and information on the connection with the SGSN.

9. The method of claim 7, further comprising the steps of:

upon receiving the first service request message, updating the service context based on the service-related information corresponding to the UE; and transmitting an MBMS service update message to the SGSN according to the connection information stored in the service context.

10. The method of claim 9, wherein the MBMS service update message includes an identifier of the MBMS service, an identifier of the UE, and an identifier of the RNC.

11. The method of claim 9, further comprising the steps of:

receiving a service response message from the SGSN in response to one of the second service request message and the MBMS service update message, and updating the service context based on an identifier of an available UE included in the service response message; and transmitting a service response message only to the available UE.

12. The method of claim 11, further comprising the steps of:

upon receiving from the SGSN a service notify message notifying that the particular MBMS service will be provided, delivering the received service notify message to at least one available UE stored in the service context;

updating the service context by a UE transmitting a response message in response to the service notify message among UEs that received the service notify message; and transmitting to the SGSN a service notify response message including an identifier of the UE that transmitted the response message.

13. The method of claim 12, further comprising the steps of:

receiving a message for requesting assignment of a radio access bearer from the SGSN in response to the service notify response message;

updating the service context by determining radio access bearer information included in the message and additional radio bearer information based on the radio access bearer information; and transmitting the additional radio bearer information to the SGSN.

14. The method of claim 13, further comprising the steps of:

setting radio resource information for transmitting MBMS data for the MBMS service to a UE corresponding to an identifier of a UE stored in the last updated service context;

updating the service context based on radio resource information set for the UE and a UE for which radio resource information was successfully set; and reporting the set radio resource information to the SGSN.

15. A method for managing a service context of an individual MBMS (Multimedia Broadcast/Multicast Service) service by an SGSN (Serving GPRS (General Packet Radio Service) Supporting Node) to provide a predetermined MBMS service among a plurality of MBMS services from an MB-SC (MBMS Source Center) to at least two cells among a plurality of cells in a system including the plurality of the cells where a plurality of user equipments (UEs) are located, a radio network controller (RNC) connected to the cells, the SGSN connected to the RNC, and the MB-SC connected to the SGSN, the method comprising the steps of:

setting up a signaling connection with the RNC for an MBMS service when a first service request message for requesting the MBMS service is received at the RNC from a UE among the plurality of the UEs;

receiving a service request message for requesting the MBMS service from the RNC over the set signaling connection;

upon, receiving the service request message, generating a service -context corresponding to the MBMS service and storing, in the generated service context, service-related information required to provide the MBMS service to the RNC and connection information for the set signaling connection; and transmitting a service request message for requesting the MBMS service to the MB-SC.

16. The method of claim 15, wherein the service request message received from the RNC includes an identifier of the MBMS service, an identifier of the UE, an identifier of the RNC, and information on the connection with the SGSN, and the service request message transmitted to the MB-SC includes an identifier of the MBMS service, an identifier of the UE, and an identifier of the SGSN.

17. The method of claim 15, wherein if an MBMS service update message including an identifier of at least one another UE among the plurality of the UEs is received from the RNC over the set signaling connection, the service context is updated based on the identifier of the UE.

18. The method of claim 17, further comprising the steps of:

determining whether a UE managed by the service context is a subscriber capable of receiving the MBMS service, and updating the service contest according to the determination result; and upon receiving a response message from the MB-SC, transmitting a service response message with the determination result to the RNC.

19. The method of claim 18, further comprising the steps of:

upon receiving from the MB-SC a service notify message indicating that the particular MBMS service will be provided, delivering the service notify message to an RNC managed by the service context; and receiving a service notify response message from the RNC in response to the service notify message, and updating the service context based on an identifier of a UE included in the service notify response message.

20. The method of claim 19, further comprising the steps of:

determining radio access bearer-related information, and updating the service context based on the determined radio access bearer-related information;

transmitting the determined radio access bearer-related information to the RNC through a radio access bearer assignment request message; and updating the service context base on radio bearer information provided from the RNC in response to the radio access bearer assignment request message.

* * * * *